United States Patent [19]
Yaegashi et al.

[11] Patent Number: 6,154,601
[45] Date of Patent: Nov. 28, 2000

[54] METHOD FOR EDITING IMAGE INFORMATION WITH AID OF COMPUTER AND EDITING SYSTEM

[75] Inventors: Kazuhito Yaegashi, Kodaira; Seiichi Hirai, Koshigaya; Hirotada Ueda, Kokubunji, all of Japan

[73] Assignee: Hitachi Denshi Kabushiki Kaisha, Tokyo, Japan

[21] Appl. No.: 08/970,202

[22] Filed: Nov. 14, 1997

Related U.S. Application Data

[63] Continuation-in-part of application No. 08/826,975, Apr. 9, 1997, Pat. No. 5,956,453.

[30] Foreign Application Priority Data

| Apr. 12, 1996 | [JP] | Japan | 8-091420 |
| Nov. 15, 1996 | [JP] | Japan | 8-304944 |
| Nov. 15, 1996 | [JP] | Japan | 8-304945 |

[51] Int. Cl.$^7$ .................................................. H04N 5/76
[52] U.S. Cl. ........................... 386/52; 386/54; 345/328
[58] Field of Search ................................ 386/46, 52, 54, 386/95, 106, 93, 53, 55, 96; 345/328; H04N 5/76

[56] References Cited

U.S. PATENT DOCUMENTS

| 5,388,197 | 2/1995 | Rayner | 345/328 |
| 5,404,316 | 4/1995 | Klingler et al. | 345/328 |
| 5,442,744 | 8/1995 | Piech et al. | . |
| 5,541,738 | 7/1996 | Mankovitz | 358/335 |
| 5,546,191 | 8/1996 | Hibi et al. | 386/95 |
| 5,732,184 | 3/1998 | Chao et al. | 386/55 |
| 5,758,180 | 5/1998 | Duffy et al. | 345/328 |
| 5,760,767 | 6/1998 | Shore et al. | 345/328 |
| 5,781,188 | 7/1998 | Amiot et al. | . |
| 5,877,781 | 3/1999 | Tomizawa et al. | 386/52 |
| 5,956,453 | 9/1999 | Yaegashi et al. | . |

FOREIGN PATENT DOCUMENTS

| 0560624 | 9/1993 | European Pat. Off. . |
| 0564247 | 10/1993 | European Pat. Off. . |
| 9307554 | 4/1993 | WIPO . |
| 9631829 | 10/1996 | WIPO . |

OTHER PUBLICATIONS

*Journal of Visual Languages and Computing*, "Content Oriented Visual Interface Using Video Icons for Visual Database Systems", by Y. Tonomura, et al., 1990, 1, pp 183–198.

W. Kameyama, et al, "A Proposal of Multimedia Document Architecture and Video Document Architecture" Proceedings of the International Conference on Communications, U.S., NY, IEEE, 1991, pp. 511–515.

Y. Tonomura, "Content Oriented Visual Interface using Video Icons for Visual Database Systems" IEEE Workshop on Visual Languages, Oct. 4–6, 1989, pp. 68–73.

R. Baecker, et al "A Multimedia System for Authoring Motion Pictures", Proceedings of ACM Multimedia, US, NY, Nov. 18, 1996, pp. 31–42.

H. Ueda, et al "Automatic Scene Separation and Tree Structure GUI for Video Editing" Proceeding ACM Multimedia 96, Proc. 4$^{th}$ pp. 405–406.

K. Mii, et al "Design and Implementation of a News On–Demand System Integrating Retrieval and Editing of News Contents", Systems and Computers in Japan, vol. 29, No. 10., 1998, pp. 1–13.

*Primary Examiner*—Huy Nguyen
*Attorney, Agent, or Firm*—Antonelli, Terry, Stout & Kraus, LLP

[57] ABSTRACT

There is provided an editing method and an editing system for conducting editing processing on a video information material containing sound information and moving picture information with the aid of a computer. Information of the video information material is stored in a storage device. The video information is read out from the storage device. The read out video information is displayed on the screen of a display device. An editing position of the video information is displayed on the video information of the screen according to a command from a user. Upon a command from the user, the editing position is altered. Editing processing specified by the user is conducted on video information located in the displayed editing position. And edited video information is displayed on the screen.

13 Claims, 33 Drawing Sheets

FIG. 7

| |
|---|
| CUT NUMBER |
| CUT LENGTH |
| FILE NAME FOR HIGH SPEED DISPLAY |
| ADDRESS OF HIGH SPEED DISPLAY PICTURE |
| ... |

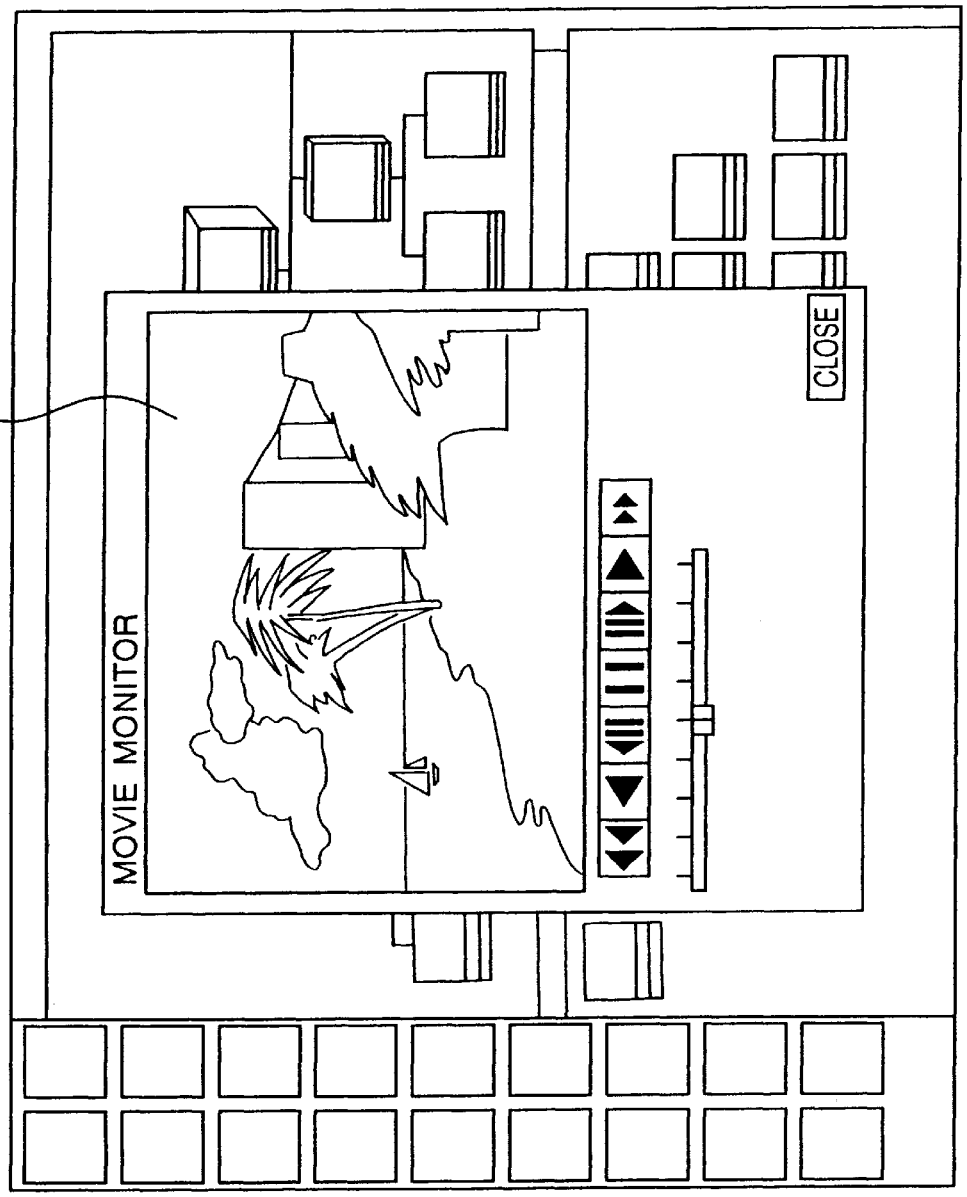

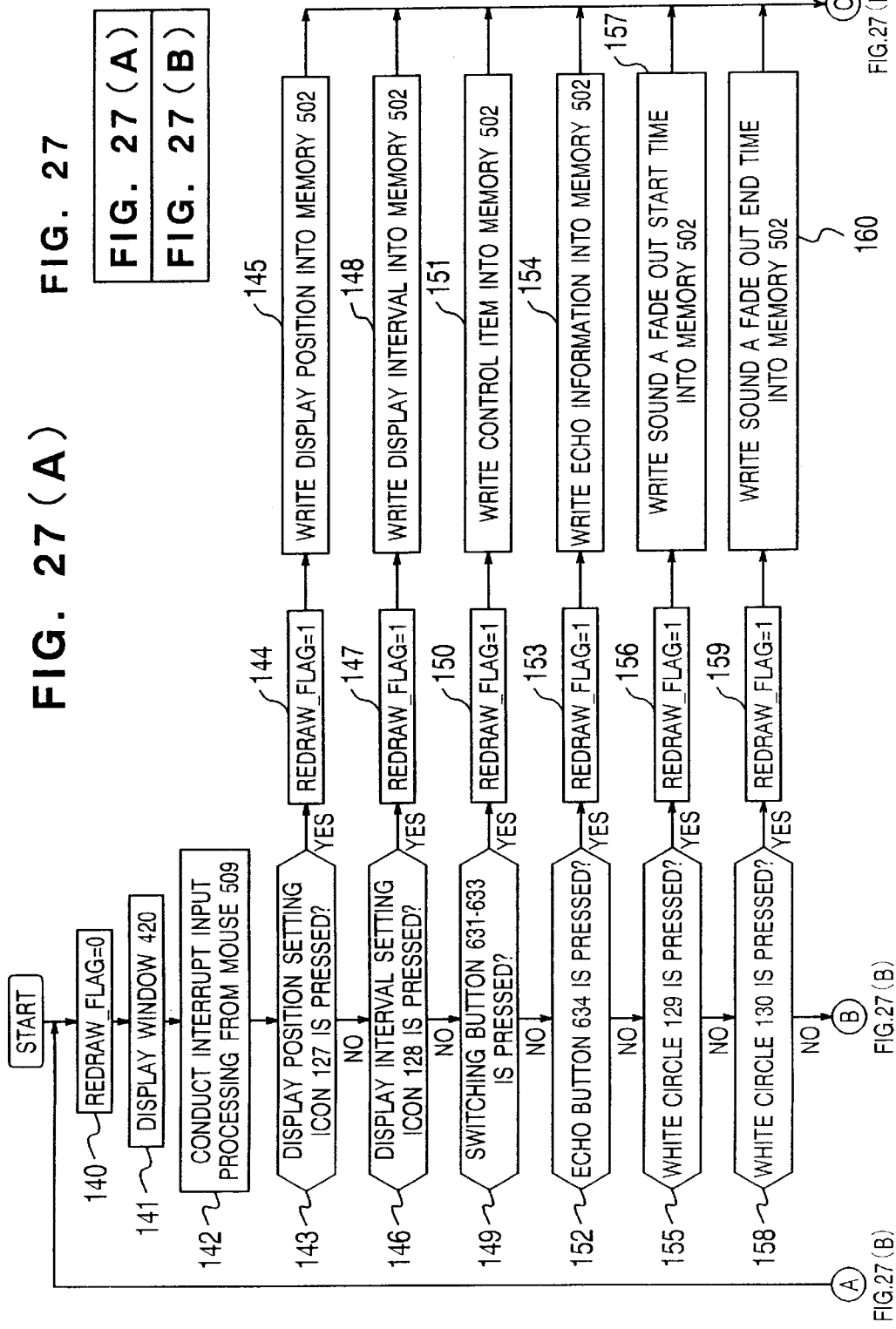

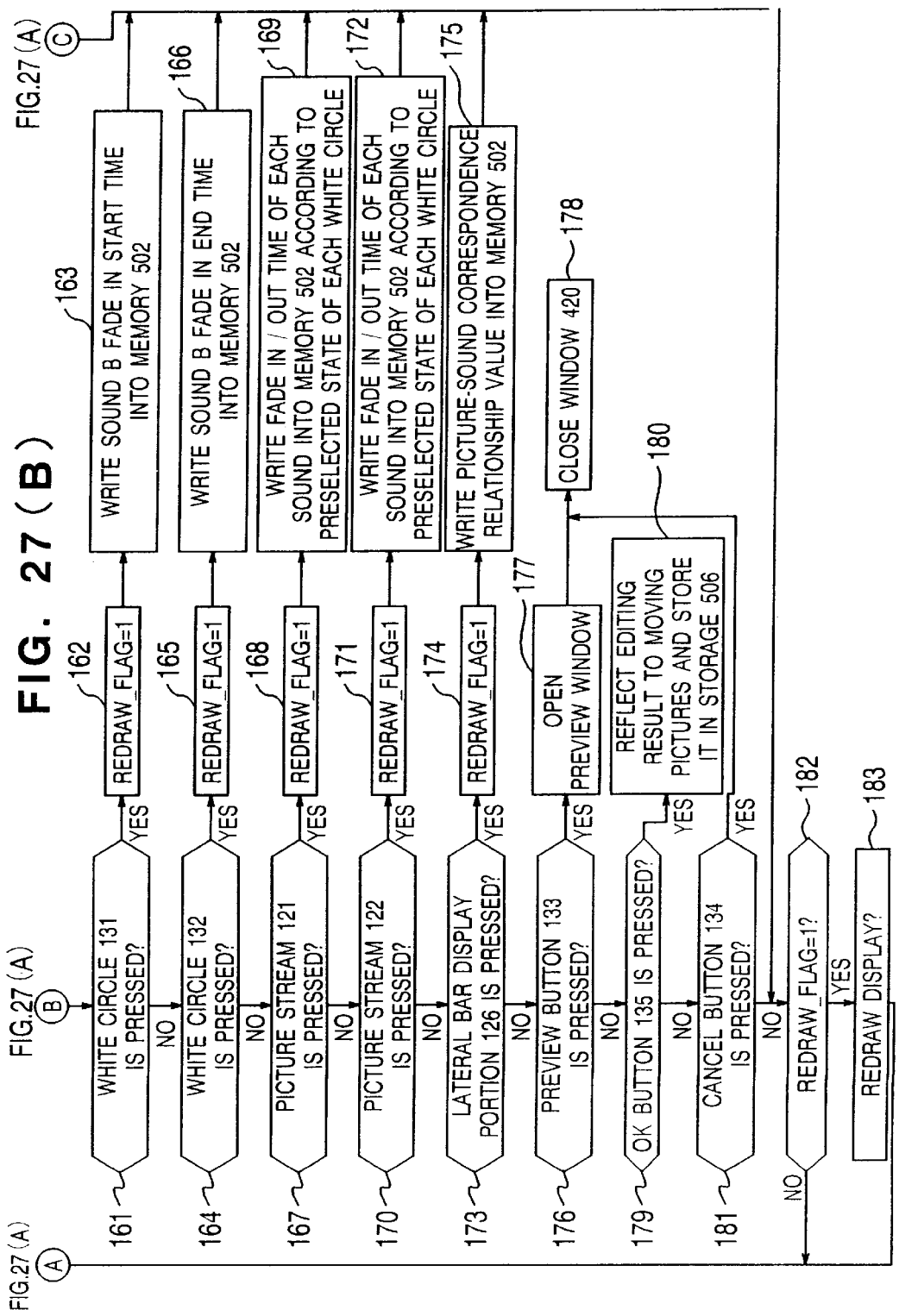

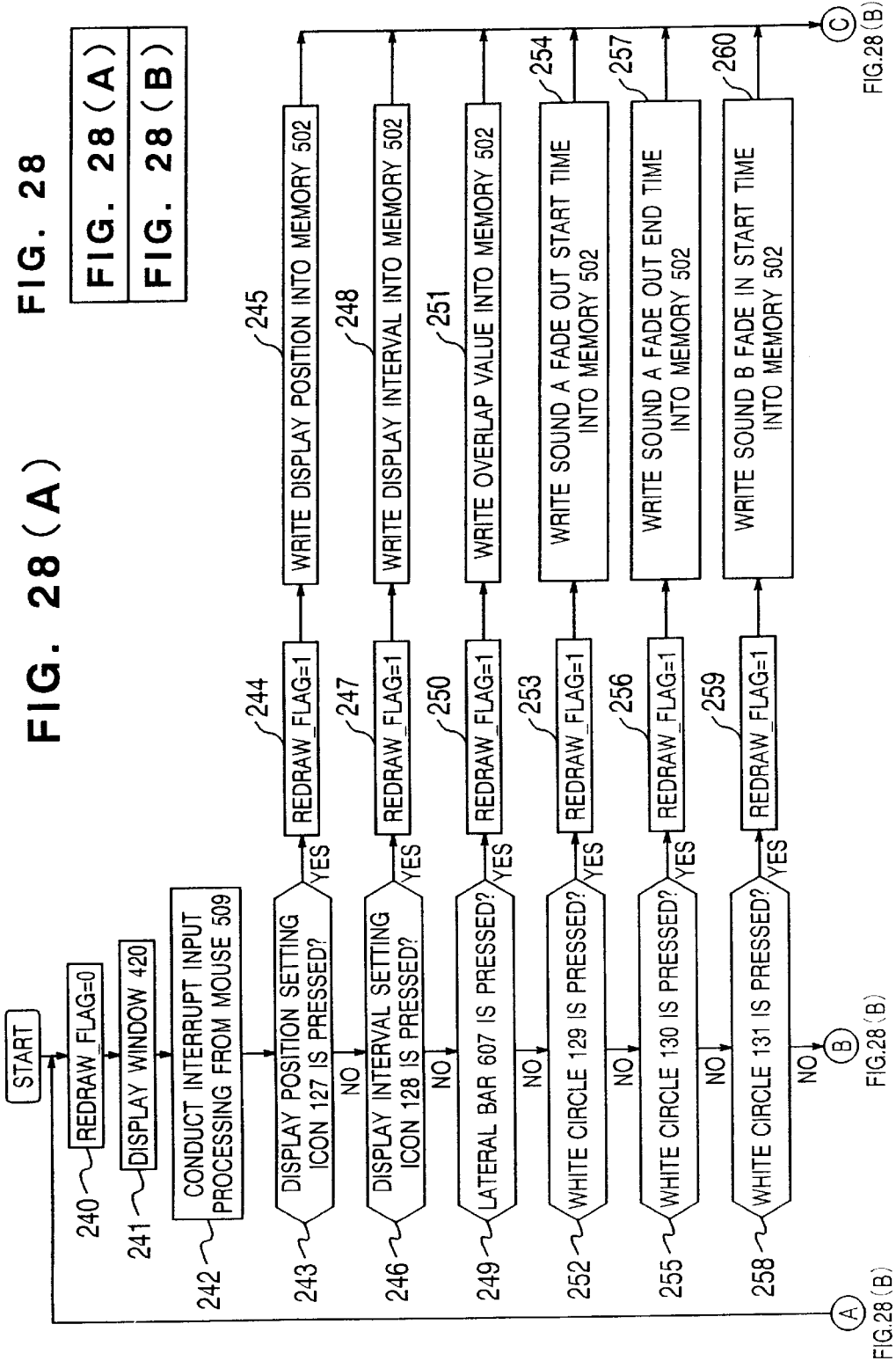

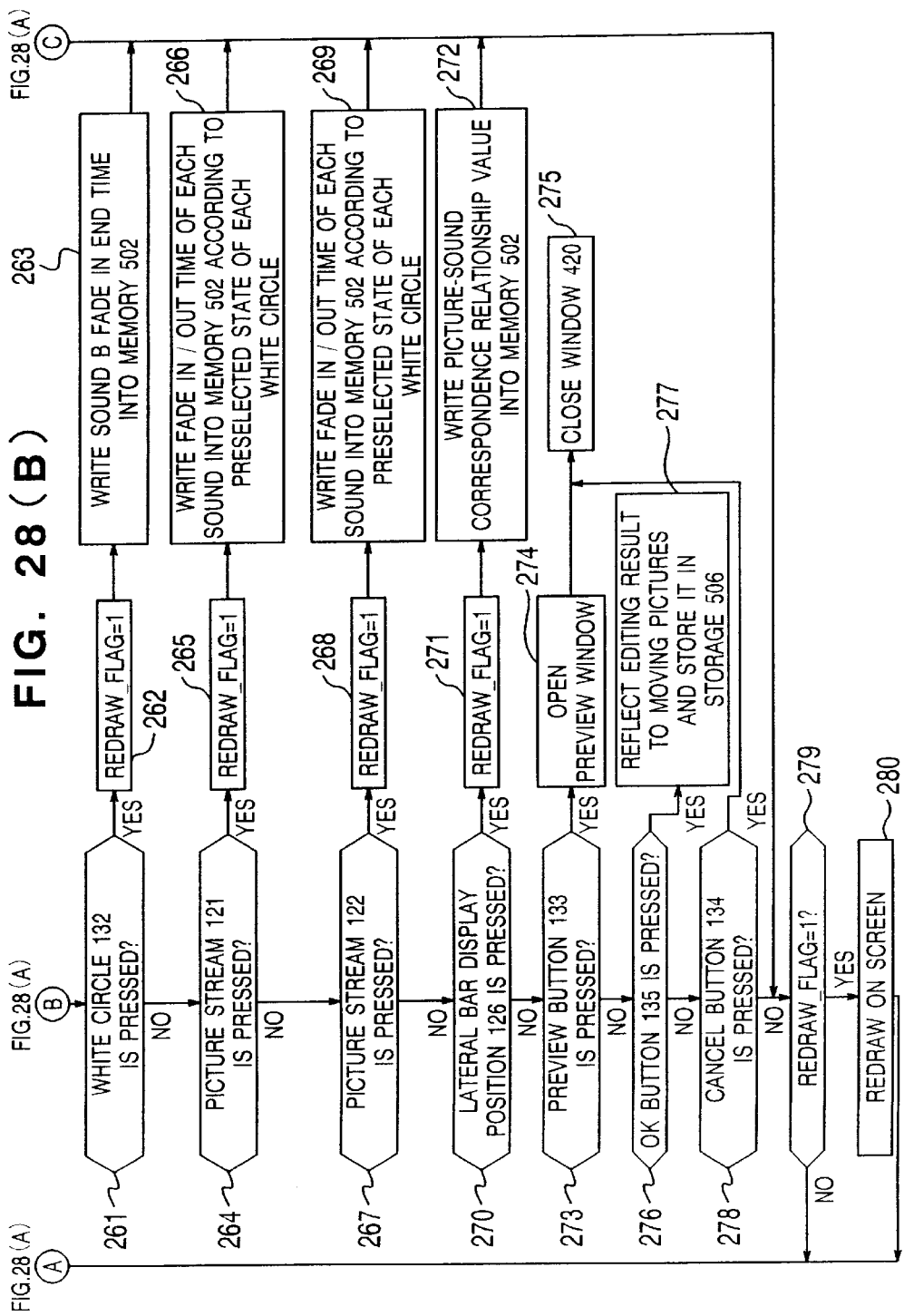

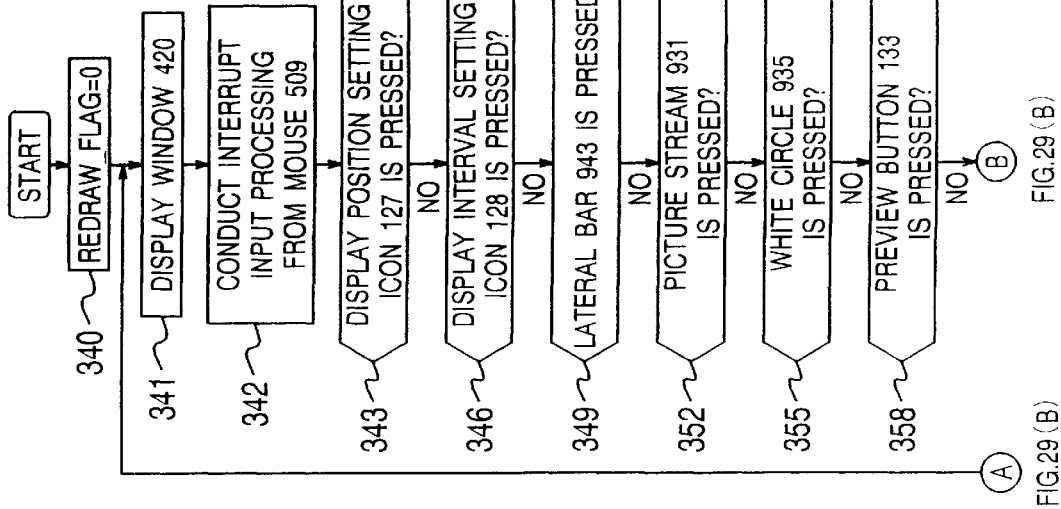

METHOD FOR EDITING IMAGE INFORMATION WITH AID OF COMPUTER AND EDITING SYSTEM

CROSS-REFERENCE TO RELATED APPLICATION

The present application is a Continuation-In-Part of U.S. patent application Ser. No. 08/826,975 filed on Apr. 9, 1997, now U.S. Pat. No. 5,956,453 disclosure of which that is incorporated herein by reference.

BACKGROUND OF THE INVENTION

The present invention relates to editing processing of moving images such as video pictures and sounds, and in particular to an image editing method and an image editing apparatus suitable for creation of television broadcast programs and video programs, and to a medium having a program recorded thereon to make a computer execute image editing processing operation.

In recent years, methods for creating television broadcast programs and video programs, enhanced by using computers have been rapidly advanced. Instead of video editing techniques of using a video tape recorder and repeating the fast feed and rewinding operation, editing is conducted by using images stored in a hard disk which is inexpensive and easy to handle and preserve. Moving image editing apparatuses using such techniques of so-called direct scheme have recently attracted attention.

In JP-A-4-207877, there is disclosed a moving image managing apparatus for displaying moving images on a screen in a hierarchical structure of a tree form including cuts and scenes and conducting editing by taking a scene or a cut as the unit.

Herein, the term "moving image" means image information which contains pictures of a plurality of frame units or sound information or both of them arranged respectively independently in time series and which can be displayed as moving images.

As for the image editing work, work to be decided by using the sensitivity of an editor is main work in any case. As for the image editing method, an apparatus of a scheme of conducting image editing by using the display for manipulating video pictures on the image editing screen, i.e., so-called icon display (hereafter referred to as icon) in association with image information is used.

In the conventional technique of such a image editing apparatus, effect editing is conducted between a desired cut (a series of a plurality of frame unit pictures) included in time serial video picture materials (moving pictures) or a scene formed by a plurality of cuts and another desired cut or another scene. FIGS. 2 and 3 show examples of screen display obtained at this time. That is, in the effect editing, a picture is switched over to another one while the contents of the picture is changed.

First of all, FIG. 2 shows an example of display of a screen for the computer aided editing work. FIG. 3 is a different example of display of a screen for the computer aided editing work. Both of these editing works use representative software for picture editing which is commercially available.

The general configuration of the editing apparatus used at this time is a system based upon a computer. To be more concrete, it is a typical and general-purpose configuration having a central processing unit, a memory and various devices operated by an operator.

FIG. 4 shows an example of an image editing system. The image editing system has a computer 401. To the computer 401, a monitor 407 including a display screen having a size of, for example, 19 inches is connected.

A video reproduction unit (VTR) 402 can reproduce any video information (image information) of the NTSC system, PAL system, or any other format system. The video information reproduced by this video reproduction unit 402 is sent to a video capture/frame storage unit 403, and converted into digital information and stored therein.

The video information thus stored in the video capture/frame storage unit 403 is then supplied to a disk accelerator 405 via an expander/compressor 404.

This expander/compressor 404 functions to compress and expand video information. An expanding/compressing processor using a JPEG (Joint Photographic coding Experts Group) chip having the highest rate at the present time is often used.

The disk accelerator 405 functions to transmit the video information sent from the video reproduction unit 402 to the video capture/frame storage unit 403 and stored therein to at least one disk storage unit 406, or functions to receive information therefrom.

By using control signals 408, 409 and 410, the computer 401 controls components of the image editing apparatus, i.e., the video capture/frame storage unit 403, the expander/compressor 404, and the disk accelerator 405.

For the purpose of the editing work and other works to be then executed, the video information stored in the disk storage unit 406 can be read out from the disk storage unit 406, and read into the video capture/frame storage unit 403 via the disk accelerator 405 and the expander/compressor 404 by using the control signals 408, 409 and 410 supplied from the computer 401.

In accessing desired video information, the apparatus shown in FIG. 4 has a feature in that it can "immediately" access (i.e., randomly access) the video information unlike the conventional sequential file apparatus needing the rewinding operation of the video tape in principle. As described above, therefore, the technique of the direct scheme is used.

The aforementioned FIGS. 2 and 3 show first and second examples of a screen for the editing work displayed on the monitor 407, respectively. In FIGS. 2 and 3, vertical lines denoted by numerals 210 and 313 are figures for indicating the reference position at the time of editing work, and they are called current position bars.

Numerals 302 and 303 on the screen of FIG. 3 denote time lines for relatively indicating the position and the range of a cut or a scene to be edited on the basis of the position of the above described current position bar. For each picture information (image information) to which the cut or scene to be edited belongs, a track for time line display is assigned and a corresponding track name is provided.

On the screen of FIG. 2, numeral 203 denotes a time line for relatively indicating the position and the range of a cut or a scene after the editing. On the screen of FIG. 3, numeral 304 denotes a time line indicating the range of synthesis when pictures of the two time lines 302 and 303 are combined and edited.

Each of numerals 201 (FIG. 2) and 301 (FIG. 3) denotes a time line window. On the window, the above described time line is displayed. The time lines 203, 302 and 303 can be moved in a scroll manner by screen manipulation.

Numeral 205 denotes a program window. In order to confirm a scene of the image (picture) of the time line 203 displayed in the time line window 201, its image is displayed in the program window 205 according to image information (video information) read out from the disk storage unit 406. A group of buttons for directing mark-in and mark-out positions which are reproduction start and reproduction stop positions of the image displaying with a mouse (not illustrated) which is a direction device connected to the computer 401 of FIG. 4 are also displayed.

Numerals 206 and 306 denote windows called working bin window or project window, for displaying video information (image information) stored in the disk storage unit 406, mainly edited image information.

For conducting effect editing, a window 305 for displaying a list of various video effect patterns and an effect setting window 312 for setting the kind of the effect or the effect quantity, or a video effect panel window 207 having the functions of these two windows together are provided.

The effect editing is editing for conducting special effect processing such as a wipe effect or a dissolve effect on an image. In the process of transition from a picture A to a picture B, the wipe effect is image processing (picture processing) of eliminating the picture A from the screen in a certain changing pattern as if it wipes off the picture A and instead causing a different picture B to appear in an area from which the picture A has been eliminated. In the process of transition from a picture A to a picture B, the dissolve effect is picture processing of causing a picture B to gradually appear while causing the luminance of the picture A to gradually fall and disappear. In the effect editing, other special effect processings other than the wipe effect and the dissolve effect may be also included.

Operation required for the effect editing will now be described in more detail by referring to FIGS. 2 and 3.

Case of FIG. 2

For each scene or cut displayed on the working bin window 206, two out of different video materials are first selected by manipulation of the mouse and arranged on the time line 203 in the order of coupling.

Subsequently, the bar 210 is moved to the position of the coupling of the two video materials by the mouse. As a result, the effect editing is started in the position of the moved bar 210.

In other words, editing work desired by the user is conducted by manipulating a menu bar 208 for selecting an effect kind, a window 209 in which an effect time can be set by means of a numerical input from a keyboard (not illustrated) connected to the computer 401 in the same way as the mouse, and sliders allowing the user to set other values, such as the width of the boundary of the vertical wipe in the scene transition from the left to the right, or the gradation quantity.

At this time, a plurality of still pictures 202 after editing are arranged and displayed on the time line window 201 at predetermined frame intervals. Thereby, it is possible to know the state of the effect of the edited scene or cut. As for the number of frame in the predetermined frame intervals, variable setting is possible. This setting is conducted by selecting a predetermined menu from a menu bar included in the program window 205.

Case of FIG. 3

From video materials differing in scene or cut displayed in the project window 306, two video materials are selected and disposed on the time lines 302 and 303 as roll A and roll B, respectively.

In the case where two scenes or cuts are subject to synthetic editing, the terms "roll A" and "roll B" are used to respectively represent the two scenes or cuts while making a distinction between them. The synthetic editing in this case is also referred to as "AB roll editing."

In order to set the effect time, the time line 303 is then moved by the mouse so as to attain a predetermined overlap width with respect to the time line 302 in the direction of the axis (time axis) of abscissas.

If any one pattern is selected by the user out of various effect patterns displayed in the video effect pattern display window 305, then the effect setting window 312 is displayed, and an effect pattern symbol is displayed in the range of the above described overlap on the time line 304.

On the effect setting window 312, the user inputs or vary the effect setting quantity, and conducts the desired editing work.

At this time, still pictures before editing are displayed respectively on the time lines 302 and 303 in the time line window 301 at predetermined frame intervals. This setting of the number of frame intervals is conducted in a slider 315.

In the editing system described by referring to FIGS. 2, 3 and 4, it cannot be said that sufficient consideration is not given to the display required for the image editing, and in particular to its kind selection. The image editing work cannot be simplified. The editing system has problems in making effective image editing possible.

In other words, first in the example of FIG. 2, the editing work is conducted by the numerical input from the keyboard while the operator is confirming the contents of the edited effects by means of the still pictures 202 displayed at the predetermined frame intervals. At this time, however, simultaneous display of pictures corresponding to the roles A and B which is effective in facilitating the AB role editing is not conducted. Therefore, the operator cannot determine the start point and end point of a scene transition at the time of scene synthesis while confirming the images obtained before editing.

Subsequently, in the example of FIG. 3, video materials of different scenes displayed in the project window 306 are respectively selected and moved onto the time lines 302 and 303. The editing work is thus conducted while displaying the pictures of the roles A and B. Therefore, the problems offered in the case of FIG. 2 are not posed. Unlike FIG. 2, however, there is no display corresponding to the still picture display (still pictures) 202 after the effect editing. Therefore, the user cannot confirm the scene transition state obtained when the effect editing has been conducted.

In the above described two examples, therefore, the start points and end points of the scene transitions of the role A and role B to be edited are confirmed by the picture display or by observing the picture of the role AB resulting from the synthetic editing. Thus there remain problems that they cannot be confirmed quickly by the picture display of the time line window alone and displays must be switched over.

In general, moving image are accompanied by sound information. In this case, editing on sounds also becomes necessary. Editing modes of sounds at this time are roughly classified into the following two kinds.

A first mode is the so-called overlap editing. When splicing a certain scene of a video picture B to a certain scene of a video picture A, sound A is gradually attenuated in the splicing place and sound B is gradually augmented. These states are overlapped.

This overlap editing is used for the purpose of preventing the unnaturalness caused by a sudden change of sound at the splicing point and making a smooth transition between scenes possible.

A second mode is the so-called mixing editing. Apart from sounds accompanying the video images, new sounds are added to the video images in the mixing editing.

This mixing editing is used when BGM (background music) or the like is desired to be accompanied with video pictures.

According to the method which has become the mainstream in conventional broadcast program production sites when conducting such editing, two VTRs are prepared and reproduction outputs of them are inputted to a mixer. While listening to the reproduced sound, the editor manipulates the mixer. While the editor is determining the degree of attenuation and the degree of augmentation of each sound during the reproduction, the editing is conducted.

The above described conventional techniques have problems that sufficient consideration is not given to facilitating the editing work and the editing work requires high skill and a great deal of labor and time.

In the editing according to the conventional technique as described above, two VTRs are prepared and reproduced outputs of them are inputted to the mixer. The editor must manipulate the mixer and determine the degree of attenuation and the degree of augmentation during the reproduction while listening to the sounds. Therefore, high skill is required for the work. In addition, in the case where modification or alteration of editing is to be conducted, it is necessary to rewind a VTR once and try again from the beginning. As a result, a great deal of labor and time are required.

In the so-called nonlinear editing heretofore used, the editing mode using the time line scheme forms the mainstream.

According to this scheme, editing is advanced by inserting materials of the video picture and sound with mouse manipulation in a window of strip-like display with the time axis direction replaced by the horizontal direction of the display screen.

In this time line scheme as well, however, both the video picture and sound are displayed by only strips having lengths according to the time lengths, respectively. This results in a problem that conducting the work while confirming the video pictures is difficult when determining the edit point in the overlap editing and determining the mixing start point in the mixing editing.

Examples of the computer aided video and audio-editing systems are disclosed in the user's guide manuals of Adobe Premiere version 4.0 (Adobe Systems Incorporated, 1994) and MEDIA SUITE PRO Version-1.0 (Avid Technology, Inc., 1994).

SUMMARY OF THE INVENTION

The present invention provides an editing method and an editing system capable of conducting the effect editing of images that like pictures or the sound or the both of them simply and rapidly by manipulation on a computer graphical user interface screen, and provides a recording medium storing a program for executing the editing processing.

The present invention provides an editing method and an editing system for conducting editing processing on an image information material containing sound information and moving picture information with the aid of a computer.

In the editing method and the editing system according to the present invention, information of the image information material is stored in a storage device. The image information is read out from the storage device. The read out image information is displayed on the screen of a display device. An editing position of the image information is displayed on the display of the image information of the screen according to a command from a user. Upon a command from the user, the editing position is altered. Editing processing specified by the user is conducted on image information located in the displayed editing position. And edited image information is displayed on the screen.

Therefore, the user can conduct editing processing while confirming both the editing material and the editing result simultaneously on the screen.

According to an embodiment of the present invention, editing of the moving picture information and/or the sound information can be conducted on the screen of the display device. According to another embodiment of the present invention, the display of relating sound information is altered so as to be linked with the editing of the moving picture information. According to a different embodiment, reduced (contracted) moving picture information are created by reducing pixels of the moving picture information, and the contracted moving pictures thus created are stored in the storage device. From the contracted moving picture information read out from the storage device, contracted moving pictures of a film image are created. The moving pictures of the film image thus created are displayed on the screen as the editing material.

BRIEF DESCRIPTION OF THE DRAWINGS

FIG. 7 is a data configuration diagram of a picture information file in an embodiment of the present invention;

FIG. 20 is a schematic diagram of a reproduction display screen for confirming the editing state in an embodiment of the present invention;

FIG. 27 is a flow chart showing the procedure of the overlap editing shown in FIGS. 17A and 17B;

FIG. 28 is a flow chart showing the procedure of wipe editing shown in FIG. 21.

DESCRIPTION OF THE PREFERRED EMBODIMENTS

Hereafter, an image editing apparatus according to the present invention will be described in more detail by referring to illustrated embodiments.

Figure 5:
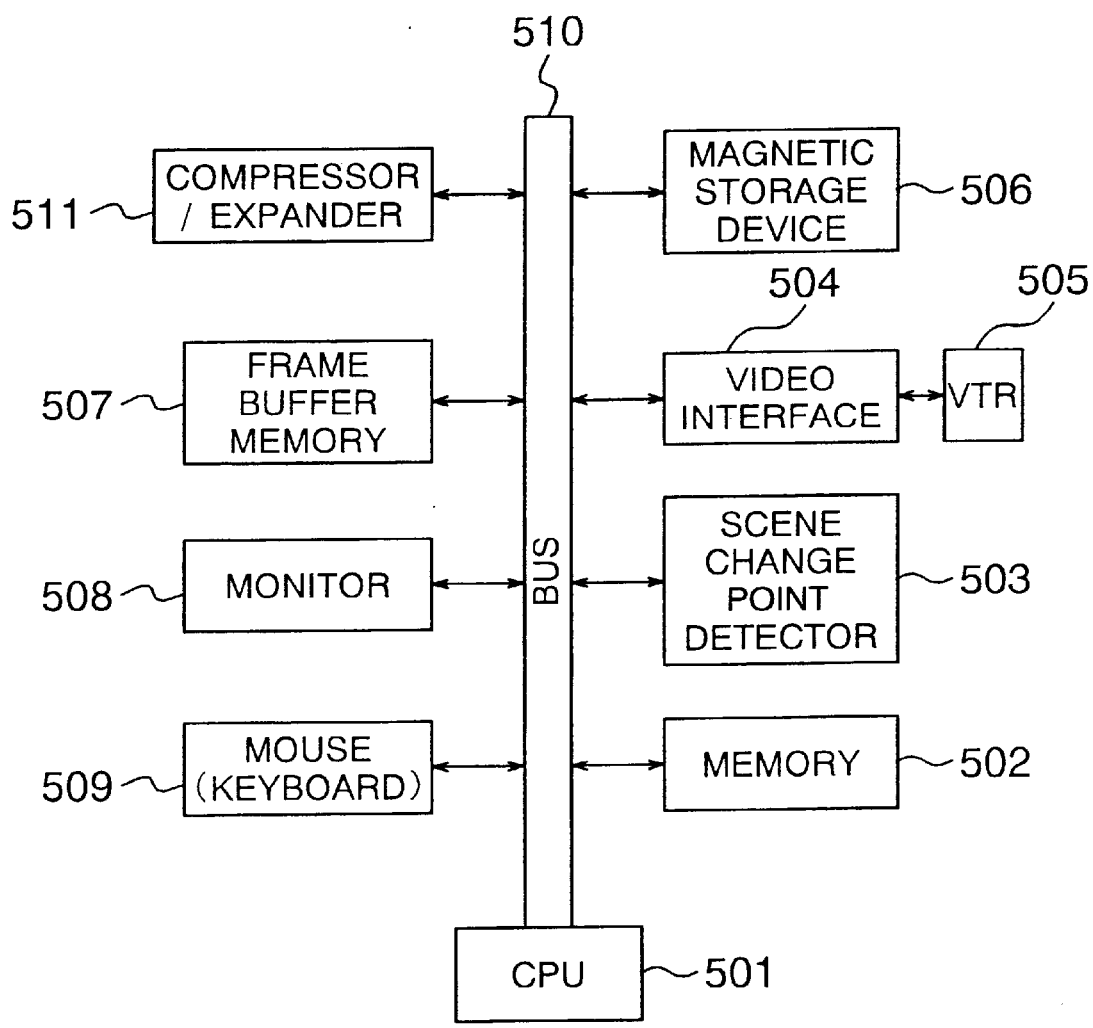
FIG. 5 is a block configuration diagram of an embodiment of a moving image editing apparatus according to the present invention.

FIG. 5 shows an example of a hardware configuration in an embodiment of the present invention. The hardware configuration includes a CPU 501 for processing various controls, a monitor 508 for displaying various kinds of information, such as image information of a scene and a cut used for image editing and a hierarchical structure (tree structure) representing the editing state, a memory 502 for storing various control programs of the CPU 501, a storage device, such as a magnetic storage device, 506 for storing image information, sound information, and editing information relating to the information, a frame buffer memory 507 for storing images to be displayed on the monitor 508, a scene change point detector 503 for detecting a scene change point between cuts, a mouse (or keyboard) 509 serving as an input device, a compressor/expander portion 511 for compressing picture information supplied from a video tape recorder (hereafter referred to as VTR) 505 to generate compressed picture data and expanding compressed picture data to reproduce picture information equivalent to the picture information supplied from the VTR 505.

From the image information stored in the magnetic storage device 506, contracted (reduced) pictures for high speed display obtained from the original image material by reducing the information content to, for example, information reduced by ¹⁄₆₄ are generated and stored in the magnetic storage device 506 under the control of the CPU 501.

The CPU 501, the memory 502, the scene change point detector 503, a video interface 504, the magnetic storage device 506, and the frame buffer memory 507 are connected to a bus 510. As a result, respective components are controlled by access from the CPU 501.

In the magnetic storage device 506, the following various kinds of information are stored:

(a) frame numbers associated with frames in a series of pictures, or frames at change points detected by the cut change point detector 503;

(b) name of file in which contracted picture data for high speed display have been filed;

(c) name of file in which compressed picture data have been filed;

(d) contracted picture data for high speed display;

(e) compressed picture data;

(f) hierarchical number representing a hierarchical step number for a plurality of scenes or cuts;

(g) cut number serially provided in the order of cut in a plurality of video image materials;

(h) sequence number representing the order, in a scene, of each of a plurality of cuts forming the scene;

(i) identification information representing whether each scene or cut should be displayed in a hierarchical structure when the hierarchical structure is displayed on the monitor 508;

As the magnetic storage device 506, a magnetic disk, an optical disk, or a different recording medium such as a magnetic-optical disk storage device may be used, or a remote file made accessible via a communication network (LAN or a network using an RS-232C interface) may be used.

Operation of an embodiment of the present invention thus configured will now be described.

First of all, in response to a command from the mouse (or keyboard) 509, a video signal which is a video image information source is outputted from video tape mounted on the VTR 505. Via the video interface 504 and the bus 510, image information according to the video signal is registered in the magnetic storage device 506.

According to the video signal outputted from the VTR 505 at this time, image information of each frame unit is supplied to the scene change point detector 503. In the scene change point detector 503, the image information is encoded and scene change points in the encoded image information are detected. Information concerning the scene change points is also registered in the magnetic storage device 506.

As a result, image information including a frame number corresponding to a frame of a scene change point of a detected scene change, a contracted picture for high speed display and a file name in which the picture has been filed, and a compressed picture and a file name in which the picture has been filed is stored in the magnetic storage device 506.

In other words, the video signal outputted from the VTR 505 is subjected to data compression in the compressor/expander 511, and the compressed picture data are also registered in the magnetic storage device 506.

The contracted pictures for high speed display are provided so as to be read out at high speed from the magnetic storage device 506 when contents of the whole of moving images formed by a plurality of frames or a scene are to be confirmed or the result of editing is to be confirmed. When the video signal is outputted from the VTR 505, the contracted pictures for high speed display are also generated on the basis of the video signal under the control of the CPU 501 and registered in the magnetic storage device 506.

The "contracted pictures for high speed display" are pictures contracted in picture size and reduced in number of pixels as compared with the original pictures in order to display a large number of cut pictures representative of each scene on the screen of the monitor 508 immediately in response to editing manipulation. In the editing system of the present invention, both a material picture to be edited and a picture completed in editing are displayed on a single screen substantially in an instant in response to a user's command. For that purpose, the information volume (such as the number of pixels or the number of scanning lines) of the original picture information is thinned out by a predetermined amount. Thus the information volume is reduced so as to allow high speed readout from the magnetic storage device 506. In addition, the size of the cut picture is contracted so that the display screen of the monitor may accommodate a required number of cut pictures. In this way, contracted pictures for high speed display are prepared beforehand. The contracted pictures for high speed display are produced by the CPU 501 by conducting processing for reducing the information volume of the original picture information of various video systems such as the NTSC system or the PAL system.

Figure 6:
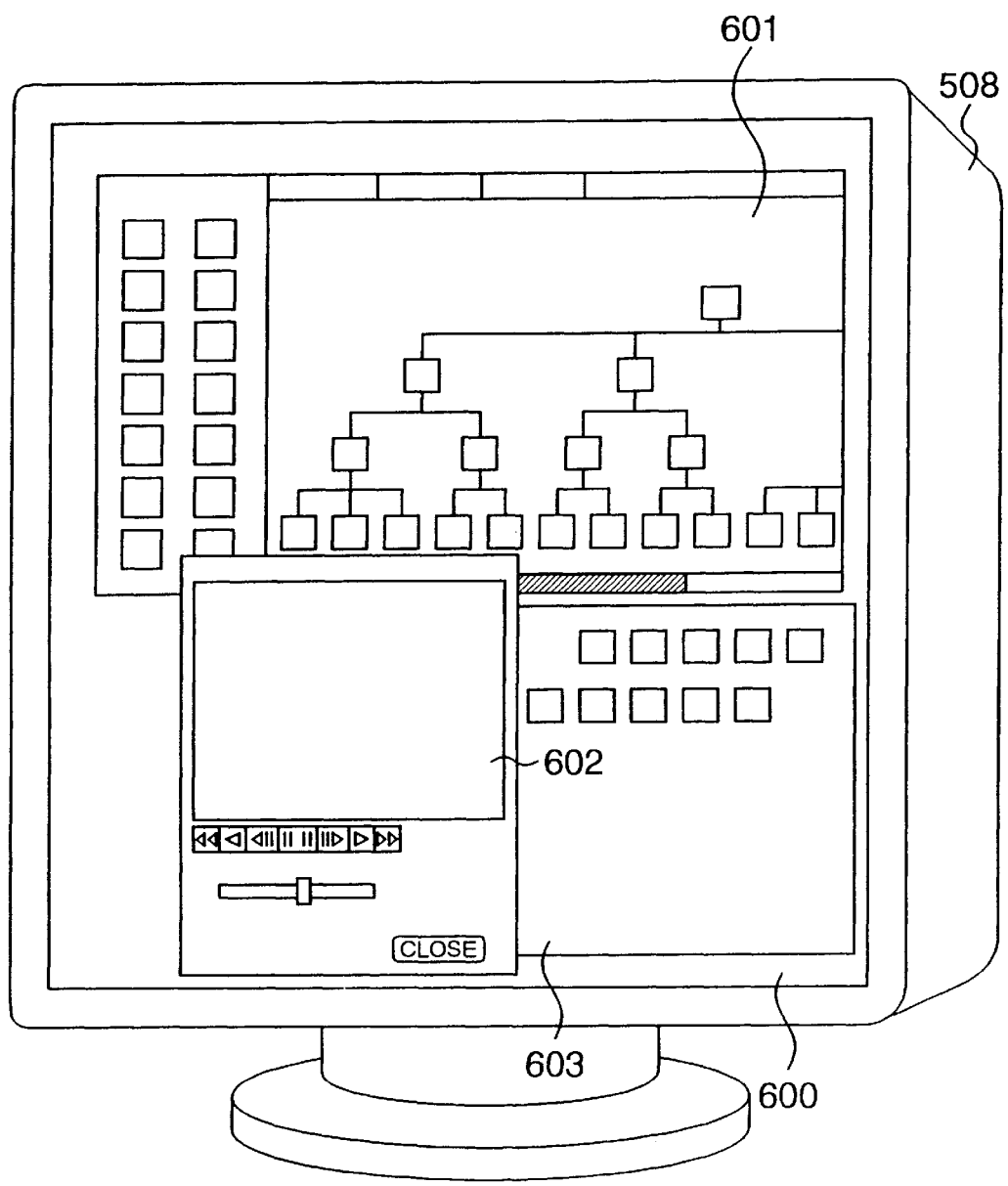
FIG. 6 is a diagram showing an example of a tree structure image on a display screen according to an embodiment of the present invention.

When it is desired to confirm the contents of the above described scene, the pictures for high speed display thus contracted are used to display the desired scene on a high-speed display window 602 shown in FIG. 6 in response to a command using the mouse (or keyboard) 509.

The window display of FIG. 6 is displayed on the screen of the monitor 508 before the effect editing according to the embodiment of the present invention is started.

For taking out a predetermined frame picture from picture data subjected to data compression, it is necessary to conduct expansion processing as is generally known. If the compressor/expander is not present as hardware, therefore, it is necessary for the CPU 501 and the compressor/expander 511 to conduct picture processing and effect the compression by using the algorithm of the JPEG system, for example. In the case of data compression/expansion processing using software, a long processing time is needed.

In this embodiment, contracted picture data for high speed display are recorded in the magnetic storage device 506 beforehand. Even if the compressor/expander for conducting the compression/expansion processing at high speed is not present as hardware, therefore, the contracted picture data for high speed display can be read out without requiring the processing time for expansion. In other words, expansion processing is unnecessary in the case where the contracted picture for high speed display are reproduced.

If the operator commands readout of the picture information for high speed display registered in the magnetic storage device 506 by using the mouse (or keyboard) 509, the CPU 501 reads out only first frames of respective cuts representing scene change points of pictures. On a display screen 600 of the monitor 508, a window 603 for taking a look at cuts as shown in FIG. 6 is thus displayed.

With respect to this display, the operator informs the CPU whether the scene change point detected by the scene change point detector 503 is proper for the contents of the image and of scene partitions by using the mouse (keyboard) 509.

The CPU 501 provides each of cuts judged to be proper as a scene change point of images stored in the magnetic storage device 506 with a cut number.

Figure 8:
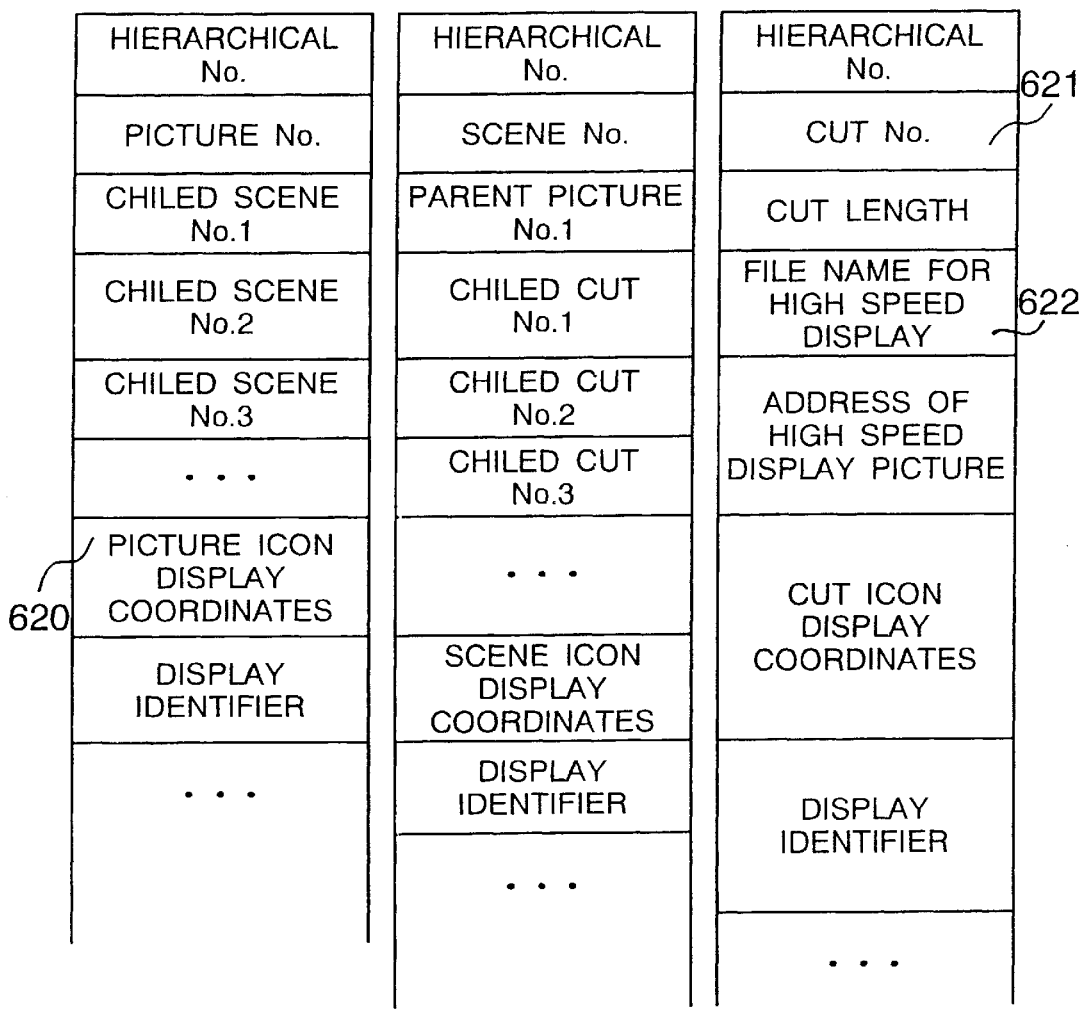
FIG. 8 is a data configuration diagram of a hierarchical structure management information file in an embodiment of the present invention.

If image editing or the like is commanded by the operator via the mouse (or keyboard) 509, tree structure management information as shown in FIGS. 7 and 8 is read out from the magnetic storage device 506 or the memory 502.

Figure 10:
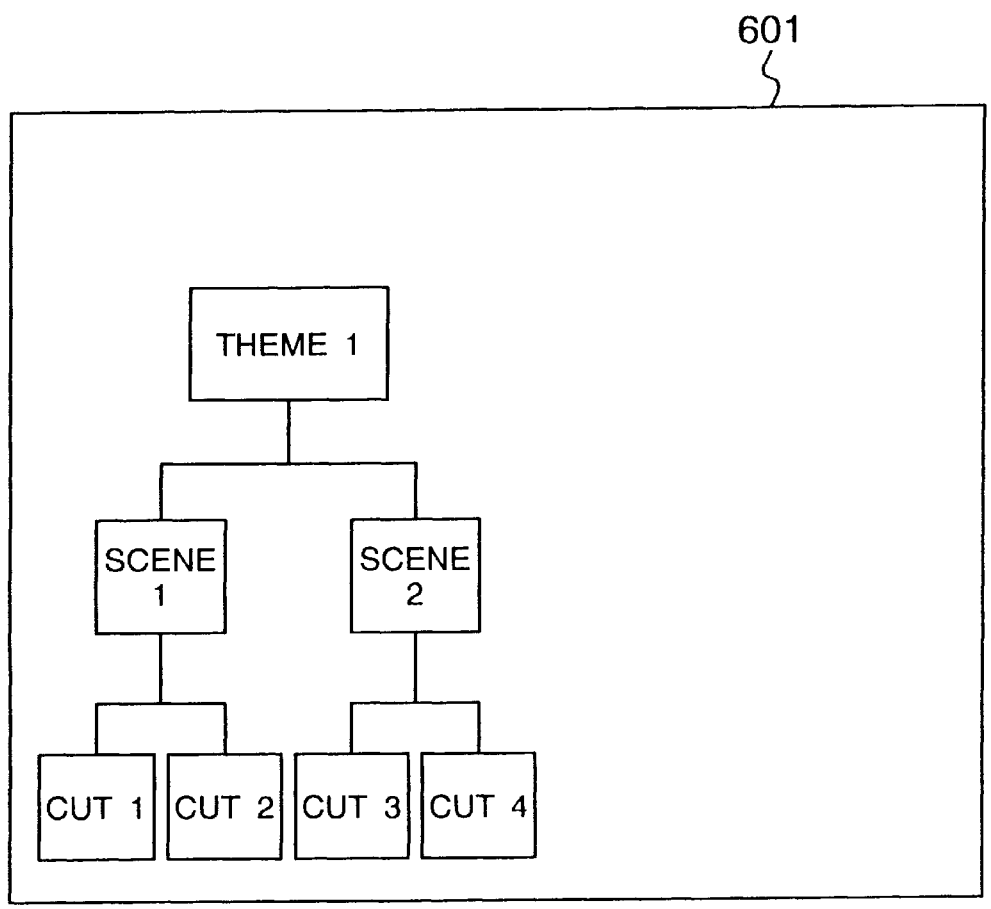
FIG. 10 is a diagram showing an example of a hierarchical structure image of picture information using a combination of representative pictures in an embodiment of the present invention.

FIG. 10 represents frame pictures (frame images) forming moving pictures recorded in the magnetic storage device 506 by using a hierarchical structure. In the system of the present embodiment, this hierarchical structure is displayed on the monitor screen. The term "cut" is defined as a set of frame pictures (frame images) shot by a TV camera from the start of a shooting operation until the end thereof. A "scene" is formed by a set of a plurality of cuts obtained by shooting a certain fixed shoot subject. Furthermore, a plurality of scenes can be collected by a specific shoot theme. Video sources can be arranged as a hierarchical structure including a plurality of cuts, a scene having a collection of a certain number of cuts, and a shoot theme or a title having a collection of a certain number of scenes. Each of cuts and scenes is provided with a specific number.

FIG. 10 shows an example of a treelike hierarchical structure of recorded video sources. It is now assumed that the shoot theme is, for example, "tropical island." In the recorded video sources, a cut 1 obtained by shooting fish in the sea around an island, a cut 2 obtained by shooting a coastal landscape, a cut 3 obtained by shooting birds inhabiting a forest, and a cut 4 obtained by shooting a flower are included. The cut 1 is formed by 1st through 90th frames, and the cut 2 is formed by 91st through 150th frames. Video pictures of the cut 1 and the cut 2 are collected as a scene 1 having images of the sea as the shooting subject. The cut 3 and the cut 4 are collected as a scene 2 having images of the forest as the shooting subject.

In the editing apparatus according to an embodiment of the present invention, a representative frame included in frames forming each cut and a frame of a representative cut included in cuts forming each scene are displayed on the screen of the above described hierarchical structure as contracted pictures for high speed display.

In the embodiment of the present invention, editing can be simply conducted by altering the original hierarchical structure displayed on the screen by simple manipulation. For example, it is possible to conduct alteration (editing) so as to generate such a hierarchical structure that the cut 1 and the cut 3 have been altered to a new scene 1 having animals inhabiting the island as the shooting subject. In the editing using the screen of the hierarchical structure, it is possible to replace or erase cuts, or add different cuts.

As for the method and system of moving image editing using the hierarchical structure, those disclosed in co-pending U.S. patent application Ser. No. 08/826,975 filed on Apr. 9, 1997 titled "Method of Editing Moving Image and Apparatus of Editing the Same" can be used in the embodiment of the present invention.

For example, in the case where management information corresponding to the tree structure as shown in FIG. 10 has been read out, it is now assumed that a command for causing images of the cut 1 and cut 2 to compose the scene 1 is inputted by the operator. Then, image data having the data structure shown in FIG. 7 and the tree structure management information having the data structure shown in FIG. 8, corresponding to the cut 1 and the cut 2 are read out from the magnetic storage device 506 by the CPU 501. In addition, a picture number serving as "a parent" in the tree structure management information is set to 1, and values "1" and "2" are set in addresses of cut numbers 1 and 2 serving as "children", respectively.

Furthermore, display coordinates where icons of these two cuts are displayed are calculated. The calculated values are set as cut icon display coordinates of FIG. 8, respectively. The tree structure management information is reregistered.

As for a scene 2 as well, tree structure management information is reregistered by similar processing.

In the case where the theme 1 generally formed by a plurality of scenes includes the scene 1 and the scene 2 as shown in FIG. 10, the tree structure management information is read out from the magnetic storage device 506. Values "1" and "2" are registered in the area of the CHILD SCENE NUMBERS 1 and 2. In the area of the PICTURE NUMBER of the management information having the scene number equal to the value "1" and the value "2," the value "theme 1" is respectively registered.

Subsequently, the operator manipulates the mouse (or keyboard) 509 and thereby issues a command that icons other than icons located in the lowest layer should not be displayed in the tree structure display window 601. Upon this command, the hierarchical structure management information is read out from the magnetic storage device 506 or the memory 502. A display identifier indicating that the icons should not be displayed in the tree structure display window 601 is added to predetermined management information, and resultant information is reregistered.

Figure 11:
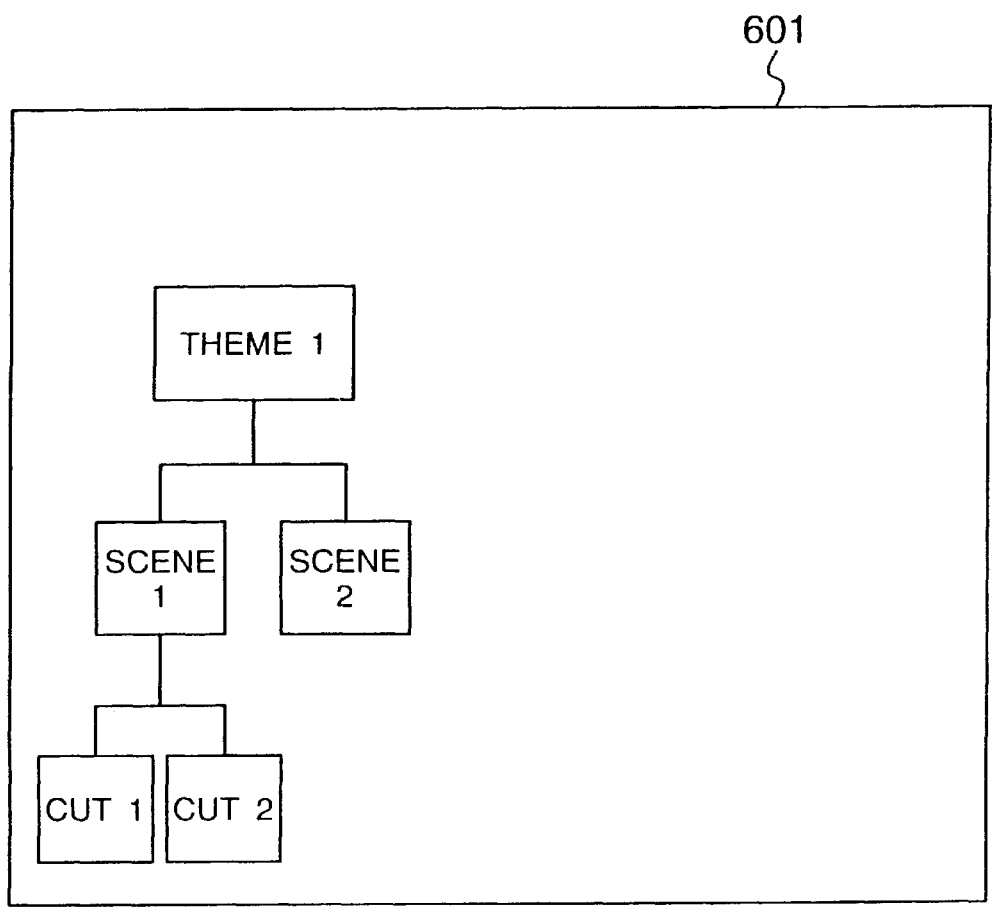
FIG. 11 is a diagram showing another example of a hierarchical structure image of picture information using a combination of representative pictures in an embodiment of the present invention.

As a result, the CPU 501 discriminates this display identifier, recalculates the display position, and conducts the display on the monitor 508. As for the display at this time, therefore, the cuts 3 and 4 supplied with the display identifiers preventing the display are not displayed as shown in FIG. 11.

Figure 12:
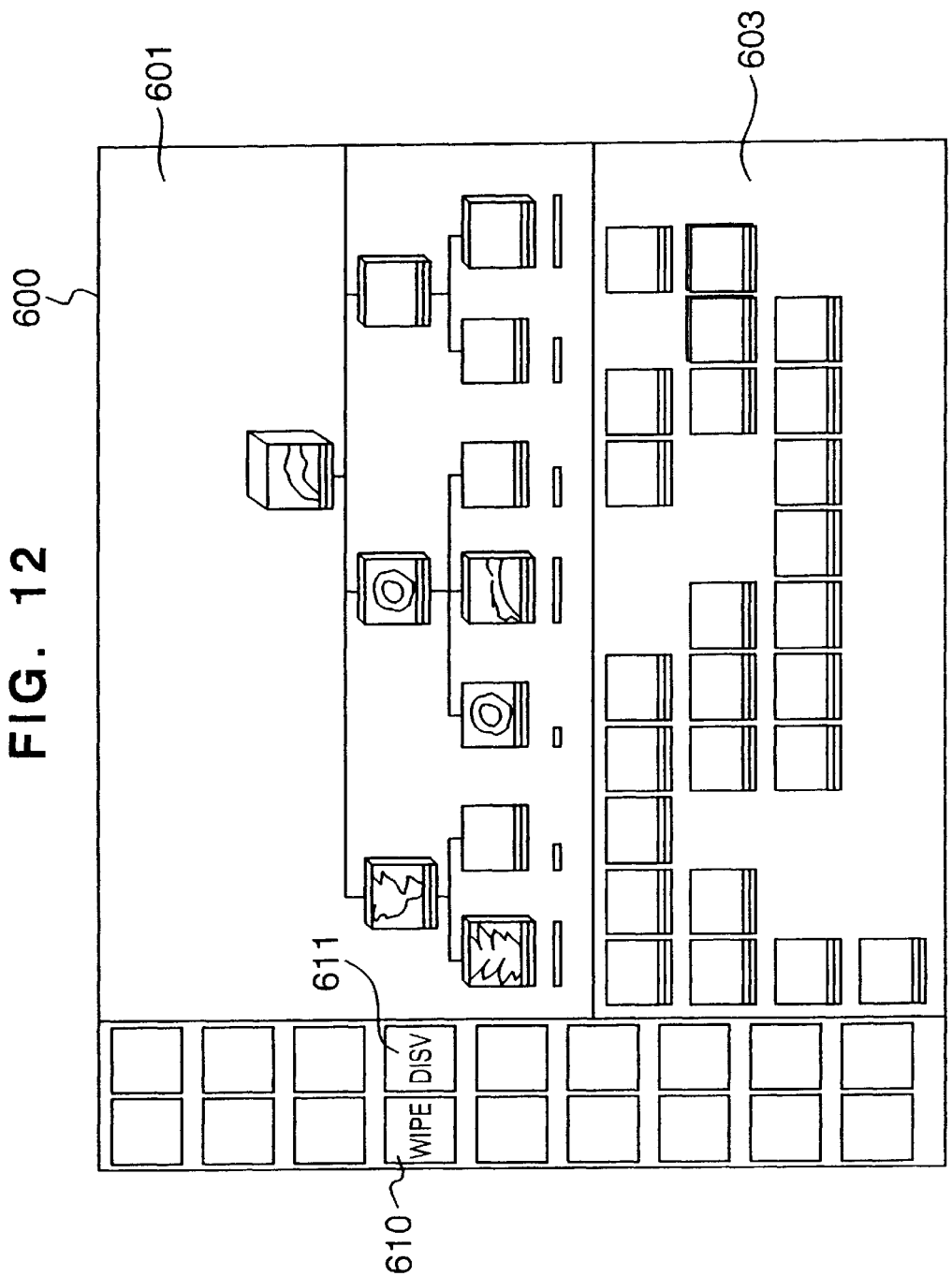
FIG. 12 is a diagram showing a display state before transition to an effect editing screen display in an embodiment of the present invention.

By successively repeating this manipulation, therefore, the CPU 501 conducts processing on the basis of display coordinates of the icon. As shown in FIG. 12, the tree structure shown in FIG. 6 is thus displayed in the tree structure display window 601 of the monitor 508.

Subsequently, transition to the effect image editing such as the wipe and dissolve is conducted.

Figure 1:
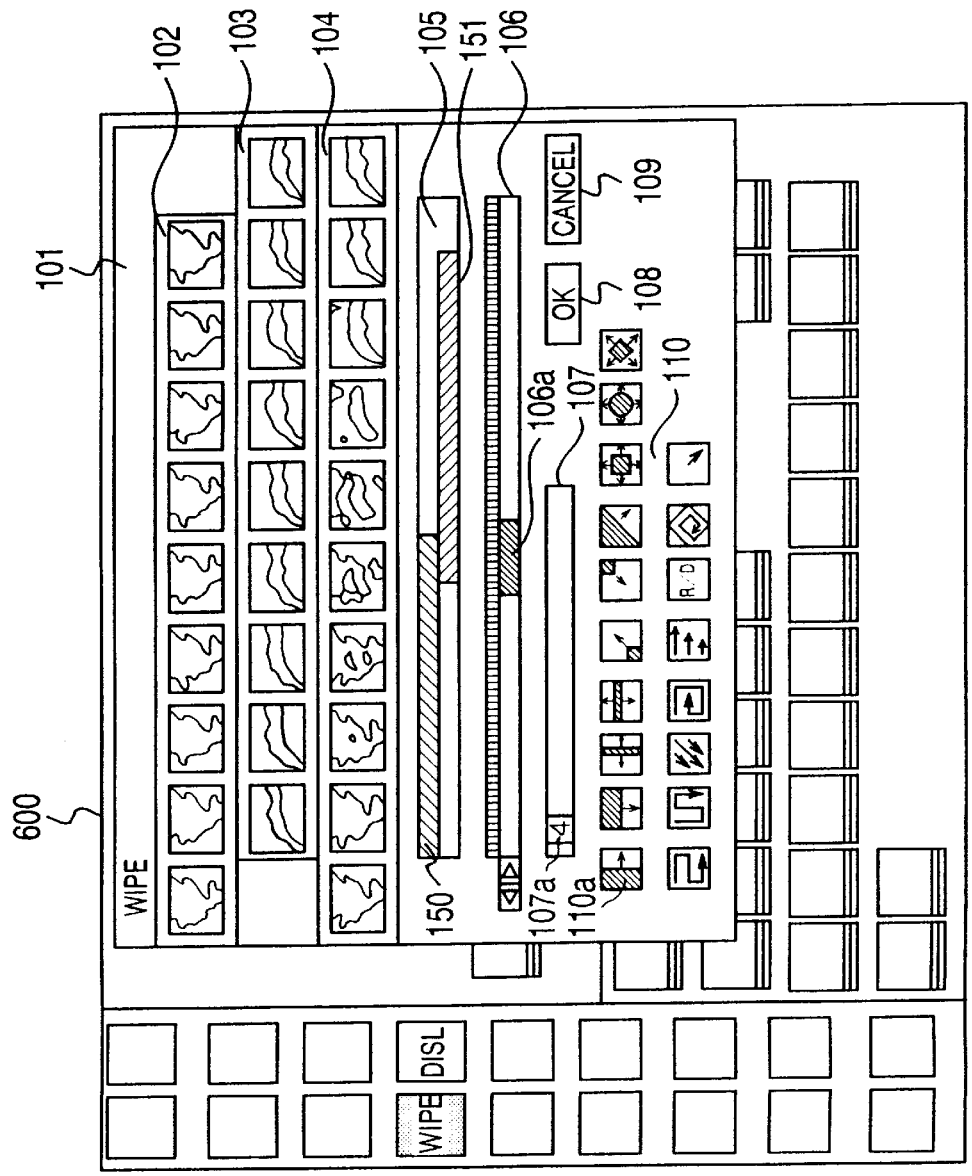
FIG. 1 is a diagram showing an example of an effect editing screen display according to an embodiment of the present invention.
Figure 2:
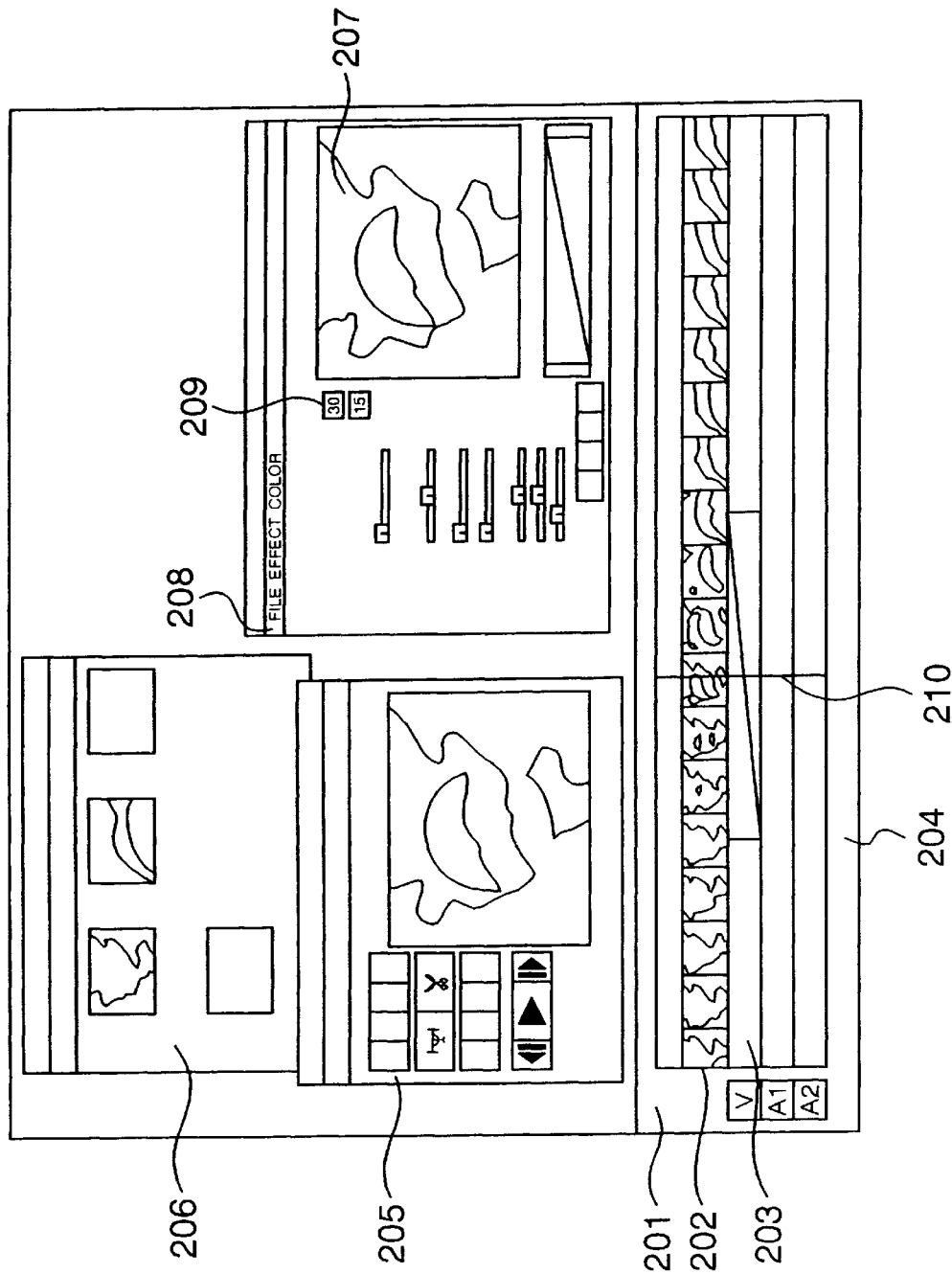
FIG. 2 is a diagram showing an example of a screen display of effect editing.
Figure 3:
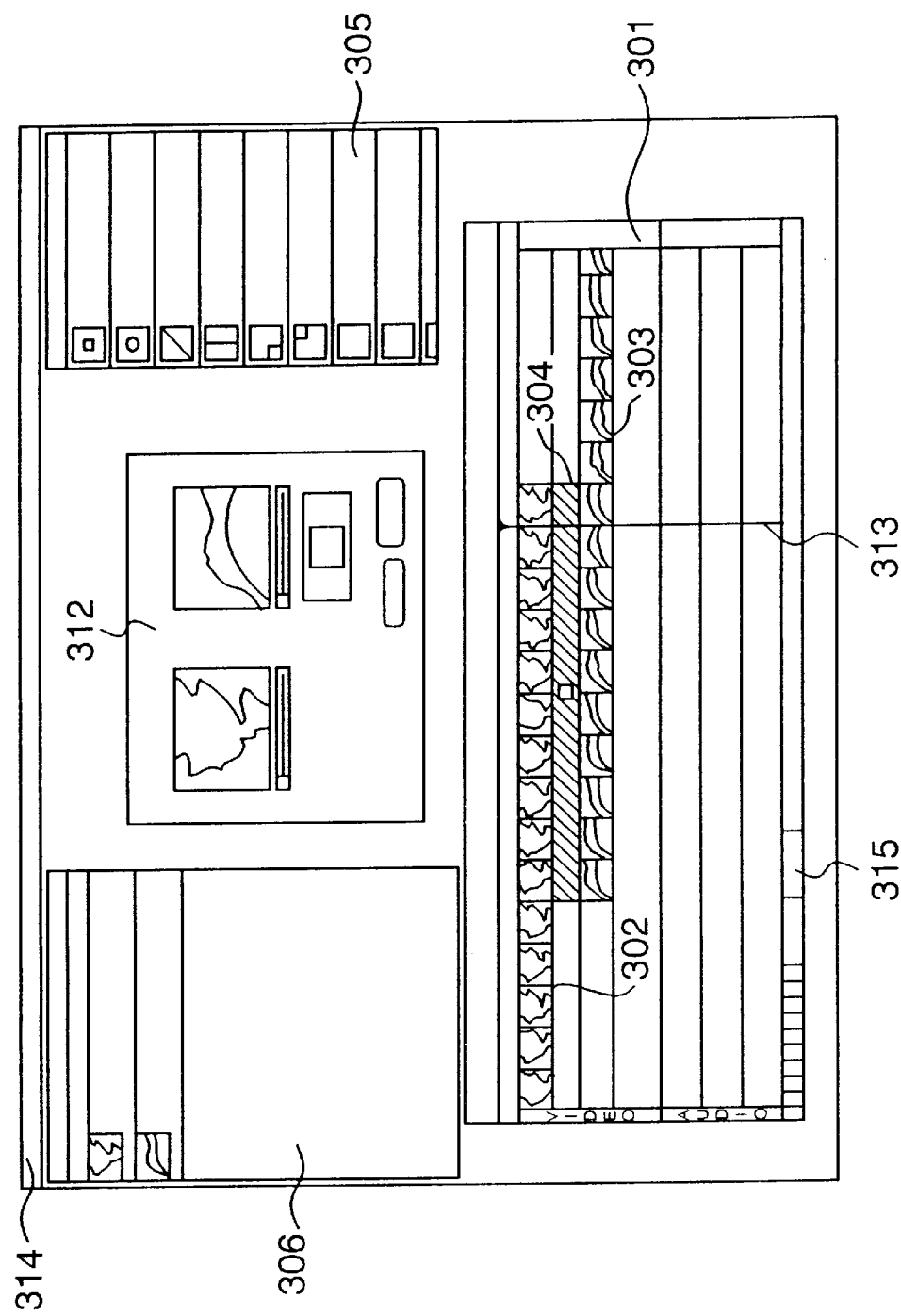
FIG. 3 is a diagram showing another example of a screen display of effect editing.
Figure 4:
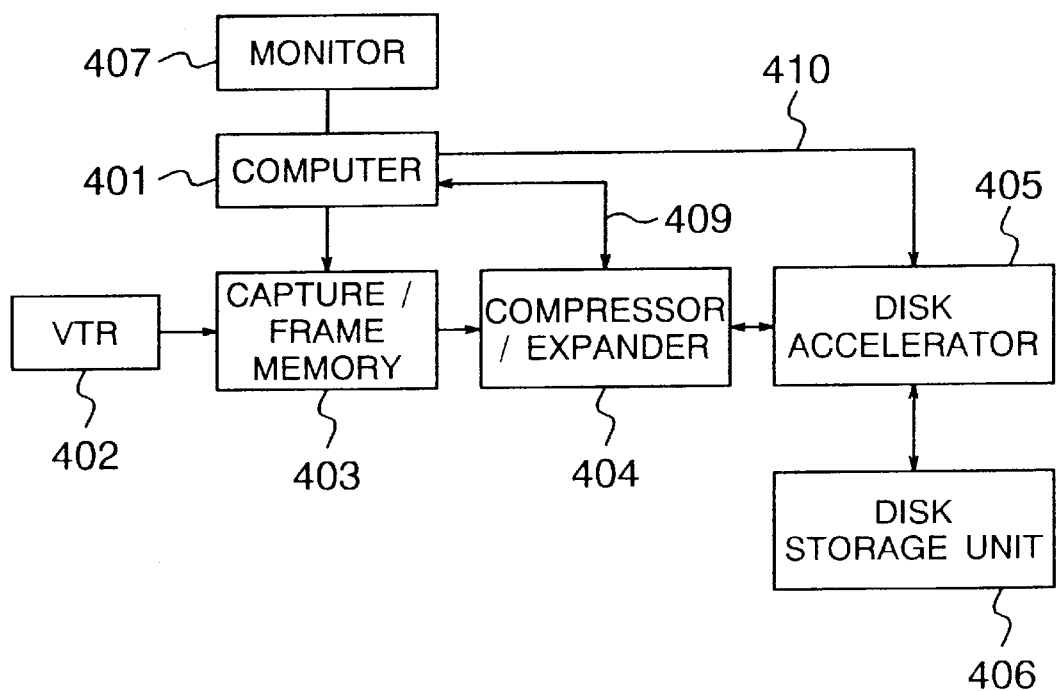
FIG. 4 is a block configuration diagram showing an example of a moving image editing apparatus according to a conventional technique.

In the configuration of this embodiment, the screen display for effect image editing shown in FIG. 1 is first obtained by selecting an icon 610 or 611 representing the start of the wipe operation function out of icon figures arranged on the left side of FIG. 12.

The tree structure shown in FIG. 6 has heretofore been described. In succession, therefore, description will be continued on this assumption. It is now assumed that the cut 1 and the cut 2 of FIG. 10 have been indicated by the operator as the subject of the effect editing. On the basis of coordinates of the two cuts indicated by the operator with the mouse 509 in the tree structure display window 601 shown in FIGS. 6 and 12, icon display coordinates 620 stored in the hierarchical (tree) structure management information of FIG. 8 are referred to and information storing the corresponding cut numbers is respectively searched.

Upon this indication manipulation, a window 101 shown in FIG. 1 for creating an effect video picture is opened on the screen of the monitor 508 (step 901 in a flow chart mentioned later).

Subsequently, a contracted picture file name 622 for high speed display stored in the second address from the address 621 of the information (FIG. 8) storing each of the searched cut numbers is read out.

Furthermore, in accordance with the frame interval value for reading the contracted picture for high speed display prepared beforehand on the memory 502 (FIG. 13), the contracted pictures for high speed display are read out from the magnetic storage device 506. The contracted pictures for high speed display of the cut 1 and the cut 2 are displayed in the window 101 shown in FIG. 1 as icon streams (image streams) 102 and 103 forming film images similar to framed photograph.

It is now assumed that at this time "2" has been set by a slider 107 (FIG. 1) beforehand as the value specifying the frame interval. Then the frame numbers read out as the contracted pictures for high speed display become 1, 3, 5, . . . . In other words, readout is performed every other frame.

Since at this time the contracted pictures are used for the high speed display in this embodiment as described above, the processing time required for the display becomes shorter.

In a region located under the icon streams 102 and 103, a film image synthesized from these two kinds film images by using the effect video processing is displayed as an icon train 104.

In FIG. 1, the film image 104 synthesized by the scene transition of the dissolve effect is shown.

In this embodiment, therefore, the icon streams 102 and 103 formed by film images similar to framed photograph are displayed as pseudo-pictures representing the roll A and the roll B. As pseudo-pictures representing the role A+B synthesized by the dissolve editing, the icon streams 104 formed by the film image similar to framed photograph is displayed. Thus the editing work of the role A+B can be conducted easily.

Under the icon streams 102, 103 and 104 in the window 101, a window 105 is set as an effect time setting area. In the window 105, rectangular figures (sliders) 150 and 151 selected and moved by the manipulation of the mouse 509 are displayed. The length of these rectangular FIGS. 150 and 151 in the lateral direction on the screen represents the number of frames of the scene (cut 1 and cut 2 at this time).

Therefore, the effect time setting can be grasped as overlap of these rectangular FIGS. 150 and 151. By moving these FIGS. 150 and 151 with the mouse 509, their lengths and overlap length are written into the memory 502. As a result, the effect time is set.

A white area of a bar FIG. 106 in FIG. 1 indicates the overall length (time) of all images forming the cut 1 and the cut 2 selected as the editing subject. A hatched rectangle 106a located at near the central part of the bar FIG. 106 indicates the time length of the contracted picture streams 102 and 103 of the cut 1 and cut 2 of the currently displayed region and the temporal position of the displayed image in all of the images.

By manipulating the mouse, the rectangle 106a can be moved. According to the moved position, film images of the place to be confirmed, of each scene of the effect portion are displayed as the icon streams 102, 103 and 104.

The position of the rectangle 106a moved by the mouse 509 at this time is also written into the memory 502. As a result, the film images displayed on the icon trains 102, 103 and 104 are set.

As the setting area for displaying the picture data for high speed display on the film images with an arbitrary reduced scale, i.e., as the setting area for displaying the picture data for high speed display with a fixed frame interval, an icon of a film image icon stream display interval setting slider 107 is set. In the slider 107 as well, a rectangle 107a moved by manipulating the mouse is displayed. At this time, the set numerical value is also displayed simultaneously within the rectangle 107a as illustrated.

In this embodiment, an OK button 108 and a cancel button 109 for icons are set. By manipulating a pointer on the screen with the mouse 509 and selecting the OK button 108, the operator can terminate the editing. By selecting the cancel button 109, the operator can abandon the processing on the way.

Furthermore, in this embodiment, several kinds of wipe patterns and dissolve patterns, and an icon area 110 for displaying other effect video processing by using figures are set. The operator selects a figure (icon) within this area 110 with the mouse 509. Thereby, a synthetic pattern of film images corresponding to the effect video processing indicated by the selected figure (icon) can be displayed. For example, a pattern 110a is an icon for a horizontal slide wipe effect wherein a picture of B role slides from the left side over a picture of A role thereby switching over the A role to B role.

In this embodiment, therefore, various data required for effect video editing such as wipe and dissolve are displayed as pictures. Furthermore, required input processing can be selected almost on the picture. Thus the work can be advanced efficiently.

By referring to a flow chart, control processing of the window 101 conducted by the CPU 501 will now be described.

Figure 9:
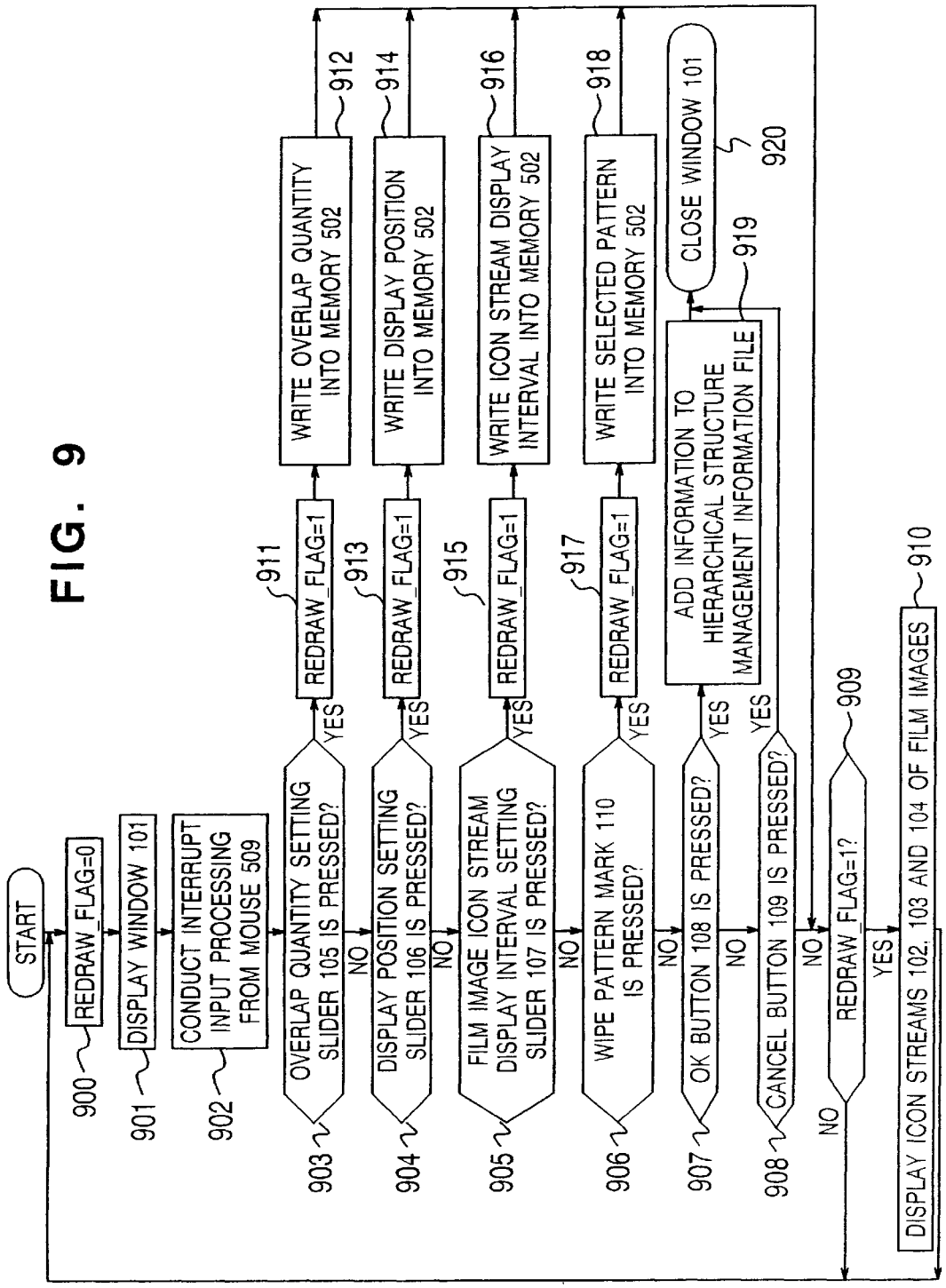
FIG. 9 is a flow chart of a program for controlling effect editing in an embodiment of the present invention.

The window 101 is controlled by using a predetermined program stored in the memory 502. FIG. 9 is a flow chart showing the control processing of the window 101 conducted by this program.

The processing of FIG. 9 is started by selecting "WIPE" 610 out of icon figures arranged on the left side of FIG. 12 with the mouse 509 as described above. First of all, initialization for making a variable "REDRAW_FLAG" set in the memory 502 set equal to "0" is conducted at step 900. The variable "REDRAW_FLAG" is a flag for determining whether display processing of the icon streams 102, 103 and 104 should be conducted.

Subsequently at step 901, processing for displaying the window 101 (FIG. 1) on the monitor 508 is conducted.

At this time, the window 101 shown in FIG. 1 is opened as to be displayed on the screen 600 of the monitor 508.

Subsequently at step 902, interrupt input the processing is conducted, and the processing proceeds to steps 903.

An interrupt caused by manipulating the mouse 509 occurs when its button is turned OFF from ON as well as when its button is turned ON from OFF. At the step 902, however, it is determined that an effective interrupt has been conducted when the button of the mouse 509 is changed from OFF to ON. At this time, position coordinates of the pointer moved with the mouse 509 on the screen are inputted.

At steps 903 through 908, the position coordinates of the pointer are compared with areas of various sliders and buttons and a wipe pattern mark of the window 101 shown in FIG. 1. Thereby, it is determined which event, i.e., which setting alteration and alteration quantity or value has been specified by the interrupt at this time.

At this time, an interrupt conducted at a meaningless place is disregarded. If an effective interrupt is not found, it is determined that there are no events and the processing proceeds to the step 909.

If an event has occurred by pointing using the pointer and an interrupt using the button of the mouse 509 at the steps 903 through 908, the processing proceeds to execution of each of processing 911 through 918 corresponding to that event. The processing 911 through 918 will be described later.

After such processing has been finished, the step 909 is executed.

At the step 909, it is determined whether the variable REDRAW_FLAG is "1." the variable REDRAW_FLAG is "1," the scene transition editing such as the wipe is interpreted as not commanded by the user and a return to the step 900 is conducted. Thereafter, the variable REDRAW_FLAG turning "1" is waited for in the loop of the steps 900 through 909.

When the variable REDRAW_FLAG is judged to be "1" at the step 909, the processing proceeds to step 910. At step 910, data for special effect window setting are read from the memory 502, and processing for displaying the icon streams 102, 103 and 104 of the film images in the window 101 is conducted. Thereafter, the variable REDRAW_FLAG is reset and returned to 0, and the processing returns to the step 900.

Therefore, processing of steps 900 through 910 is repeated until the end of the processing being able to be executed in accordance with displaying of window 101.

Individual processing of steps 903 through 908 corresponding to respective events will now be described.

If a decision result at any one of steps 903 through 906 has become "yes" as a result of selection with the pointer on the screen responsive to the mouse, then data for executing processing corresponding to the selected event are written into the memory 502 by the CPU 501 at steps 911 through 919.

Various sliders and buttons displayed on the screen are associated with interrupt events beforehand.

At step 903, the result becomes "yes" when the overlap quantity setting slider 105 has been pressed, i.e., the slider 105 has been pointed. Otherwise, the processing proceeds to the step 904.

If the result is "yes," then the variable REDRAW_FLAG is set to "1" at the step 911 and the processing proceeds to step 912. At the step 912, a numerical value inputted according to the point position specified by the mouse 509 is written in the address of the overlap quantity of the memory 502, and the processing proceeds to step 909.

At step 904, it is determined whether the display position setting slider 106 has been pressed. If the slider 106 has been pressed, the processing proceeds to the step 913. Otherwise, the processing proceeds to the step 905.

At the step 913, the variable REDRAW_FLAG is set to "1" and the processing proceeds to step 914. At the step 914, a numerical value specified by the mouse 509 is written into an address of a film image display start frame number of the memory 502 and the processing proceeds to the step 909.

At step 905, it is determined whether the film image icon stream display interval setting slider 107 has been pressed. If the slider 107 has been pressed, the processing proceeds to the step 915. Otherwise, the processing proceeds to the step 906.

At the step 915, the variable REDRAW_FLAG is set to "1" and the processing proceeds to step 916. At the step 916, a numerical value specified by the mouse 509 is written into an address of a film image icon stream display interval number of the memory 502 and the processing proceeds to the step 909.

At step 906, it is determined whether the wipe pattern mark 110 has been pressed. If the wipe pattern mark 110 has been pressed, the processing proceeds to the step 917. Otherwise, the processing proceeds to the step 907.

At the step 917, the variable REDRAW_FLAG is set to "1" and the processing proceeds to step 918. At the step 918, a numerical value specified by the mouse 509 is written into an address of a wipe pattern number of the memory 502 and the processing proceeds to the step 909.

At step 907, it is determined whether the OK button 108 has been pressed. If the OK button 108 has been pressed, the processing proceeds to the step 919. Otherwise, the processing proceeds to the step 908.

At the step 919, the overlap quantity and the wipe pattern number read from a predetermined number of addresses beginning at the recording address of the pertinent cut number of the memory 502 are written into the hierarchical structure management information file of FIG. 8, and the processing proceeds to step 920.

At step 920, processing for closing the window 101 is conducted.

Thereafter, a return to the original display screen shown in FIG. 12 is effected, and the effect editing is once finished.

At step 908, it is determined whether the cancel button 109 has been pressed. If the cancel button 109 has been pressed, the processing proceeds to the step 920. Otherwise, the processing proceeds to the step 909.

At this time, therefore, the hierarchical structure management information file is not rewritten, and the processing is finished while maintaining the original information.

The editing processing program represented by the flow chart shown in FIG. 9 is stored in the memory 502 in a code signal form which can be read by the CPU 501. The memory 502 may be a recording medium such as a semiconductor memory, a CD-ROM, a magnetic disk or an optical disk. The editing processing program of the embodiment of the present invention represented by FIG. 9 may be installed in a user's general-purpose computer in such a form as to be stored in such a recording medium. Alternatively, the editing processing program may be stored in an external storage device located in a remote place and downloaded to the memory 502 via a communication line.

In the embodiment of the present invention heretofore described, each scene to be edited and the picture subjected to the effect processing such as the wipe can be simultaneously displayed at the time of video editing using the scene transition such as the wipe. In the same way as the case using the moving picture display, therefore, it is possible to make the most of the advantages of the direct scheme and conduct various effect editing manipulations including the AB role editing efficiently and easily.

Furthermore, in the embodiment of the present invention, it is not necessary to use hardware for processing such as the wipe or compression/expansion processing of pictures. Therefore, it is possible to sufficiently suppress the cost increase and the size increase of the apparatus.

An embodiment in which sound information is edited by an image information editing system according to the present invention will now be described by referring to drawing.

Figure 13:
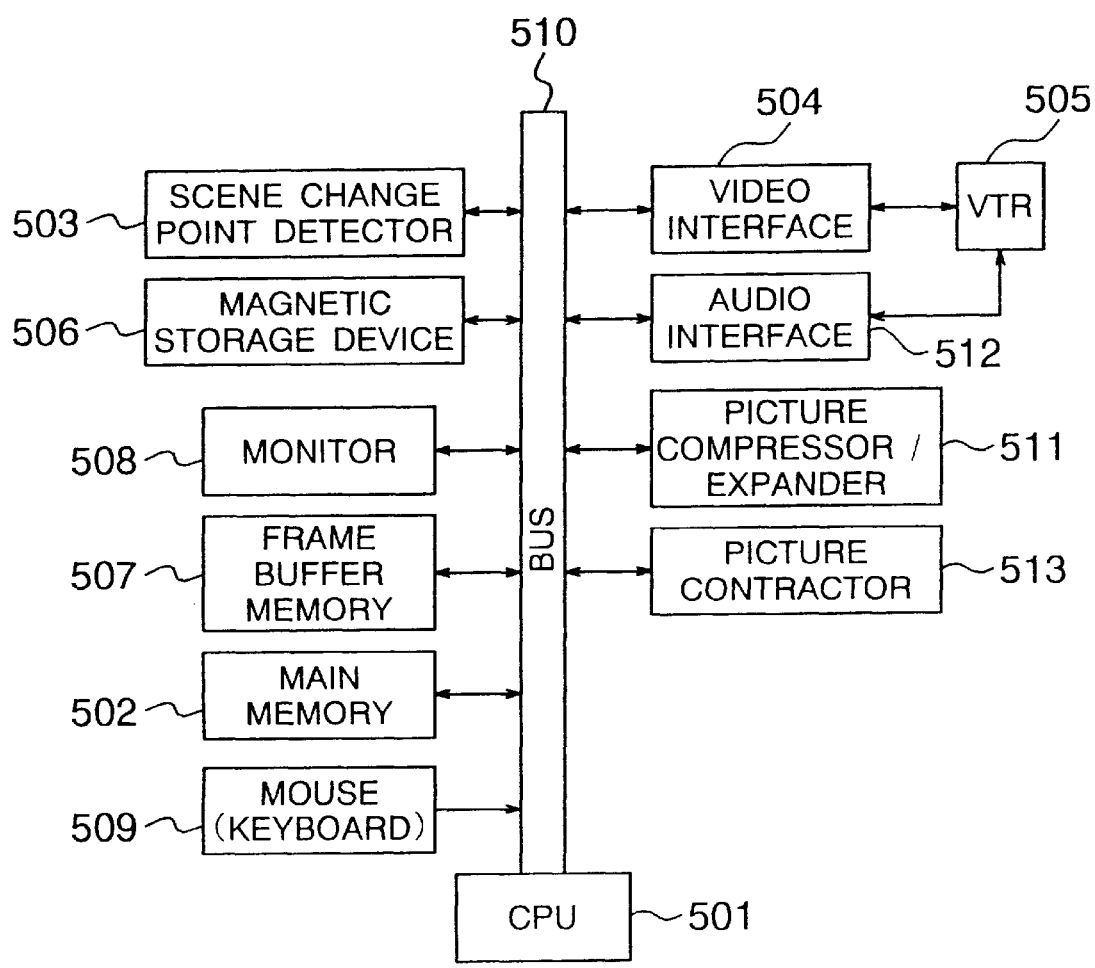
FIG. 13 is a block diagram showing an example of a moving image editing apparatus used in an embodiment of the present invention.

FIG. 13 shows an example of an apparatus used for such moving image editing. The same reference numerals as those of the system in FIG. 5 basically refer to like components.

A scene change point detector 503 analyzes the change of color distribution for each frame of moving pictures and detects a scene change point which is a change point between cuts. A picture contractor (reducer) 513 thins out pixels of an original image material and thereby creates moving pictures for high speed display. A magnetic storage device 506 stores the moving pictures for high speed display and stores moving picture analyzing information describing the detection result supplied from the detector 503 and the moving pictures for high speed display.

A monitor 508 displays the moving pictures stored in the magnetic storage device 506 on the basis of the analyzing information. The monitor 508 also provides the user with an editing screen for implementing a GUI (graphical user interface). By the GUI, the user can conduct various data input manipulations including selection out of predetermined display areas displayed in a picture conducted by manipulating an input device such as a mouse or a keyboard, and an output display corresponding to the manipulation is conducted.

A frame buffer 507 stores images to be displayed on the monitor 508. A main memory 502 stores various control programs. A mouse or keyboard 509 is a command input device of various operations.

A video interface 504 is supplied with a video signal fed from a VTR (video tape recorder) 505, and converts the video signal to a moving image format handled by this apparatus. A picture compressor/expander 511 conducts data compression on original video information and expands the compressed information. An audio interface 512 conducts conversion processing on sound signals so that the sound signals may be exchanged between the VTR 505 and a computer. A CPU 501 controls the above described components and manages their operations.

Together with the CPU 501, the scene change point detector 503, the magnetic storage device 506, the monitor 508, the frame buffer memory 507, the main memory 502, the mouse or keyboard 509, the video interface 512, the picture compressor/expander 511, and the audio interface 512 are connected to a bus 510, and controlled by an access signal supplied from the CPU 501.

Instead of the magnetic storage device 506, a different storage medium such as an optical magnetic storage device may be used. Or a remote file connected to the bus 510 via a network may be used.

On the basis of the scene change point detection information detected by the scene change point detector 503, the CPU 501 takes out a picture located at a scene or cut change position out of the moving pictures for high speed display. The CPU 501 displays a representative picture of a scene or a cut to which that picture belongs on the monitor 508 as icon pictures 1302 through 1304 in a tree structure display window 1301 shown in FIG. 14. The term "icon" refers to a small picture or figure for the screen display manipulation.

Figure 14:
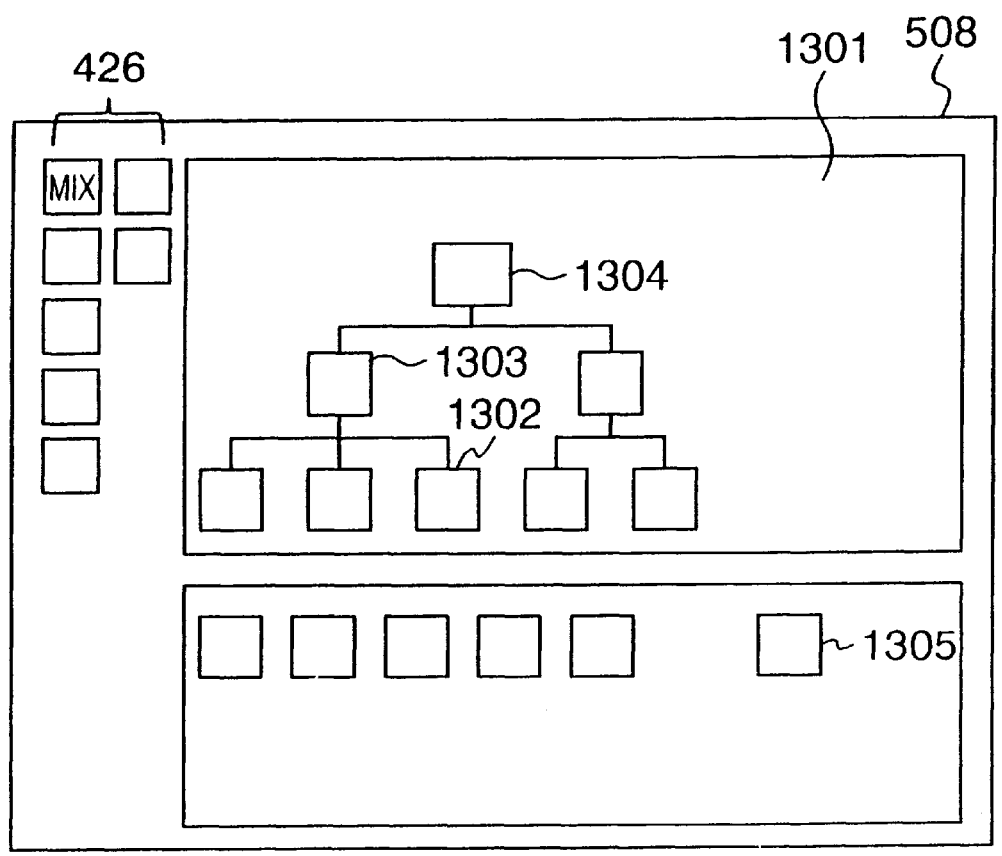
FIG. 14 is a schematic diagram of a display screen before a display for editing in an embodiment of the present invention.

The user (editing worker) handles pictures displayed on the screen of the monitor 508 and shown in FIG. 14 as the subject of editing manipulation, and assembles them on the icon editing screen as the hierarchical structure (tree structure). Thus the user advances the editing.

As for the method and system of the moving image editing using the hierarchical structure, those disclosed in co-pending U.S. patent application Ser. No. 08/826,975 can be used.

In the tree structure of FIG. 14, a picture located in a middle class, for example, the picture 1303 represents a plurality of pictures 1302 located in the lower class and belonging to the picture 1303 as one group and corresponds to a chapter or section of a story. Similarly, the picture 1304 located in the highest class represents, for example, a plurality of pictures 1303 located in the lower class and corresponds to the whole story.

According to this method, editing can be conducted by taking a scene or a cut as the unit. Therefore, assembling of the story is facilitated. In addition, division of inputted moving images by taking a scene or a cut as the unit is conducted in a nearly automatic manner. As a result, the user is hardly troubled. In addition, it is possible to store and manage moving images in a hierarchical structure. This results in an advantage that a required scene or cut can be searched for easily. The burden on the user in the moving image editing can thus be lightened.

The editing system of the embodiment shown in FIG. 13 provides a moving image sound editing method facilitating the editing work of sounds accompanying the moving images, such as overlap editing or mixing editing, by manipulating icons on the display screen.

In the sound editing according to the embodiment of FIG. 13, pictures of a portion of image information to be edited are displayed as film images from the left to the right on the display screen. By watching this film image display, it becomes possible to associate picture information with sound information. Since the screen display manipulation with GUI can be conducted on corresponding portions on lateral bar figures, editing of sound information is facilitated.

Figure 15:
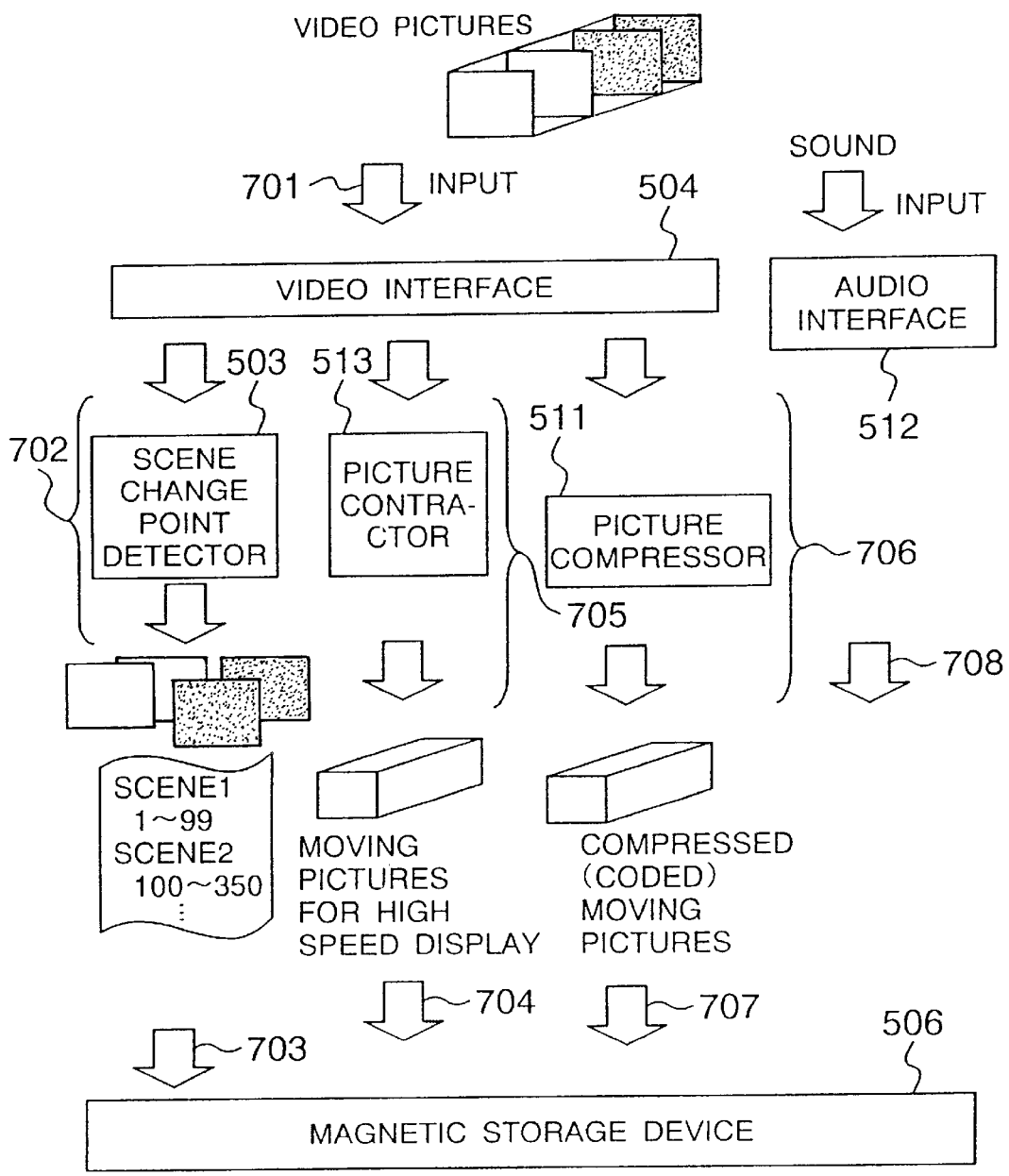
FIG. 15 is a diagram showing operation conducted by a moving image editing apparatus used in an embodiment of the present invention.

Operation in an embodiment of the present invention using the moving image editing apparatus of FIG. 13 will now be described by referring to FIGS. 13 and 15. In FIG. 15, an arrow represents control processing conducted by the CPU 501.

In response to a command fed from the operator via the mouse or keyboard 509, the picture signal and the sound signal are outputted from the video tape mounted on the VTR 505, and a process for registration of the video signal and the sound signal into the magnetic storage device 506 is started. At this time, the moving image of one frame unit is supplied from the VTR 505 to the scene change point detector 503 via the video interface 504 and the bus 510 (processing 701 of FIG. 15).

The scene change point detector 503 digitizes this inputted moving picture, analyzes the color distribution information between pictures, and detects a scene change point (processing 702).

Moving image analyzing information (scene analyzing information) including the frame number of the scene change point generated by the scene change point detector 503 is stored in the magnetic storage device 506 (processing 703).

At the same time, moving pictures for high speed display are stored in the magnetic storage device 506 (processing 704).

The moving pictures for high speed display are obtained by conducting the contraction processing (reduction processing) (processing 705) by which the imaginably same data as the moving images inputted to the scene change point detector 503 is contracted for conducting various displays according to the environmental size of the GUI. The moving pictures for high speed display become the subject of manipulation in the present editing apparatus.

For returning an arbitrary image selected out of encoded moving images to a video signal and reproducing the image, it is necessary to decode the encoded moving images. In the CPU 501, the processing time for this decoding is required.

In this embodiment, contracted pictures for high speed display are stored beforehand as described above. Therefore, decoding processing is not conducted, and decoding processing time for that purpose becomes unnecessary. The overall processing time can be thus made shorter.

Simultaneously with the scene change point detection processing (processing 702) and storage of the moving pictures for high speed display into the magnetic storage device 506 (processing 704), the moving pictures are encoded in the picture compressor 511 by using a picture compression technique (processing 706) and the encoded moving pictures are stored in the magnetic storage device 506 (processing 707).

The stored encoded moving pictures are used in the case where high speed display is not required, such as the case where the user desires to watch the final result of editing in detail.

On the other hand, the sound output signal reproduced from the VTR 505 also becomes digitized sound information via the audio interface 512 and is stored in the magnetic storage device 506 (processing 708).

Then the editing worker (operator) commands readout of the moving pictures for high speed display registered in the magnetic storage device 506 by using the mouse or keyboard 509.

In response to this, the CPU 501 reads out the scene analyzing information of the corresponding moving image from the magnetic storage device 506. On the basis of that information, the CPU 501 reads out only the picture of the only first, for example, frame of each scene from the moving pictures for high speed display, and displays it in a main window 421 on the monitor 508 as shown in FIG. 16.

Icons such as moving picture display on the main window at this time become the subject of manipulation in this embodiment.

Figure 16:
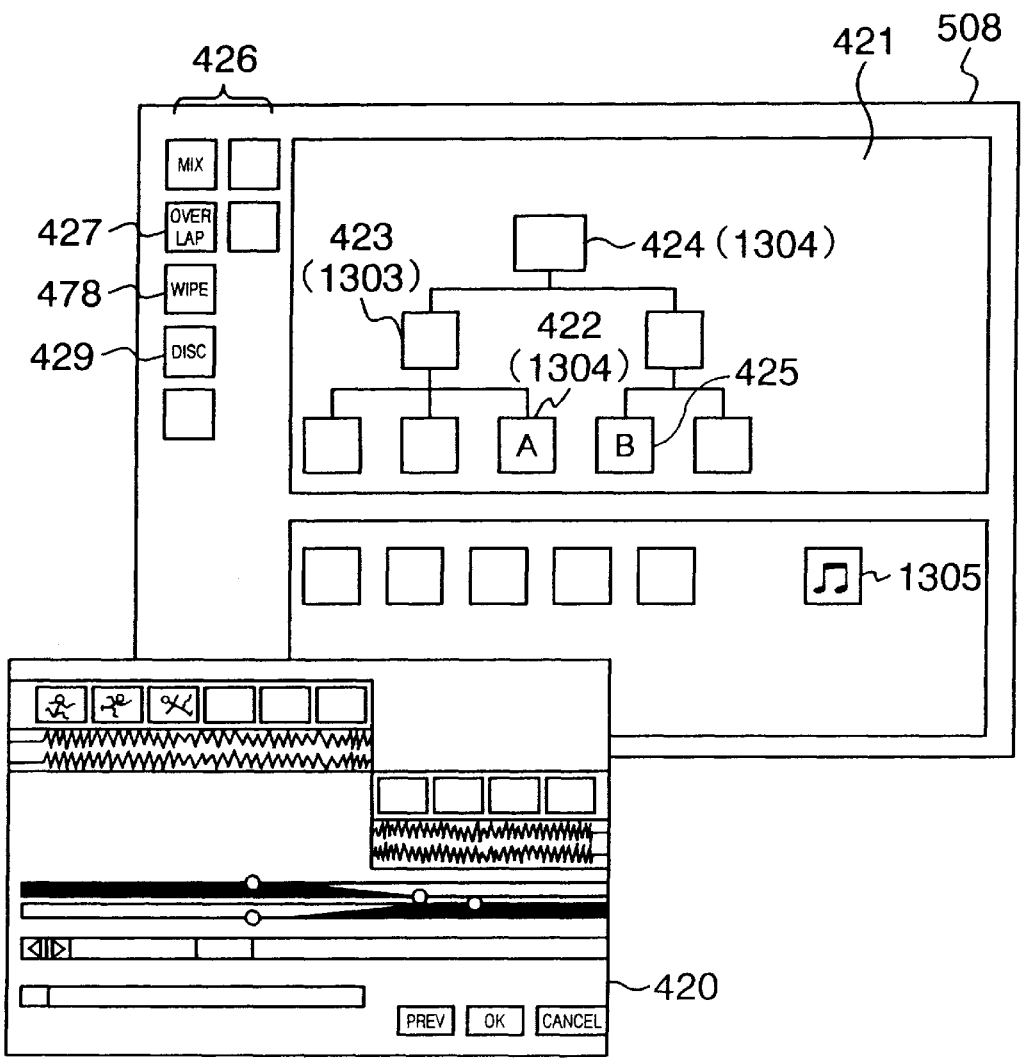
FIG. 16 is a schematic diagram showing an example of an editing screen display according to an embodiment of the present invention.

The operator manipulates icons on the monitor display screen, and assembles them into a hierarchical structure (tree structure) shown in the tree structure display window 421 of FIG. 16. Thus the moving image according to the story is created.

Hereafter, a concrete case will be described by taking the overlap editing for the tree structure shown in FIG. 16 as an example.

Figure 17A:
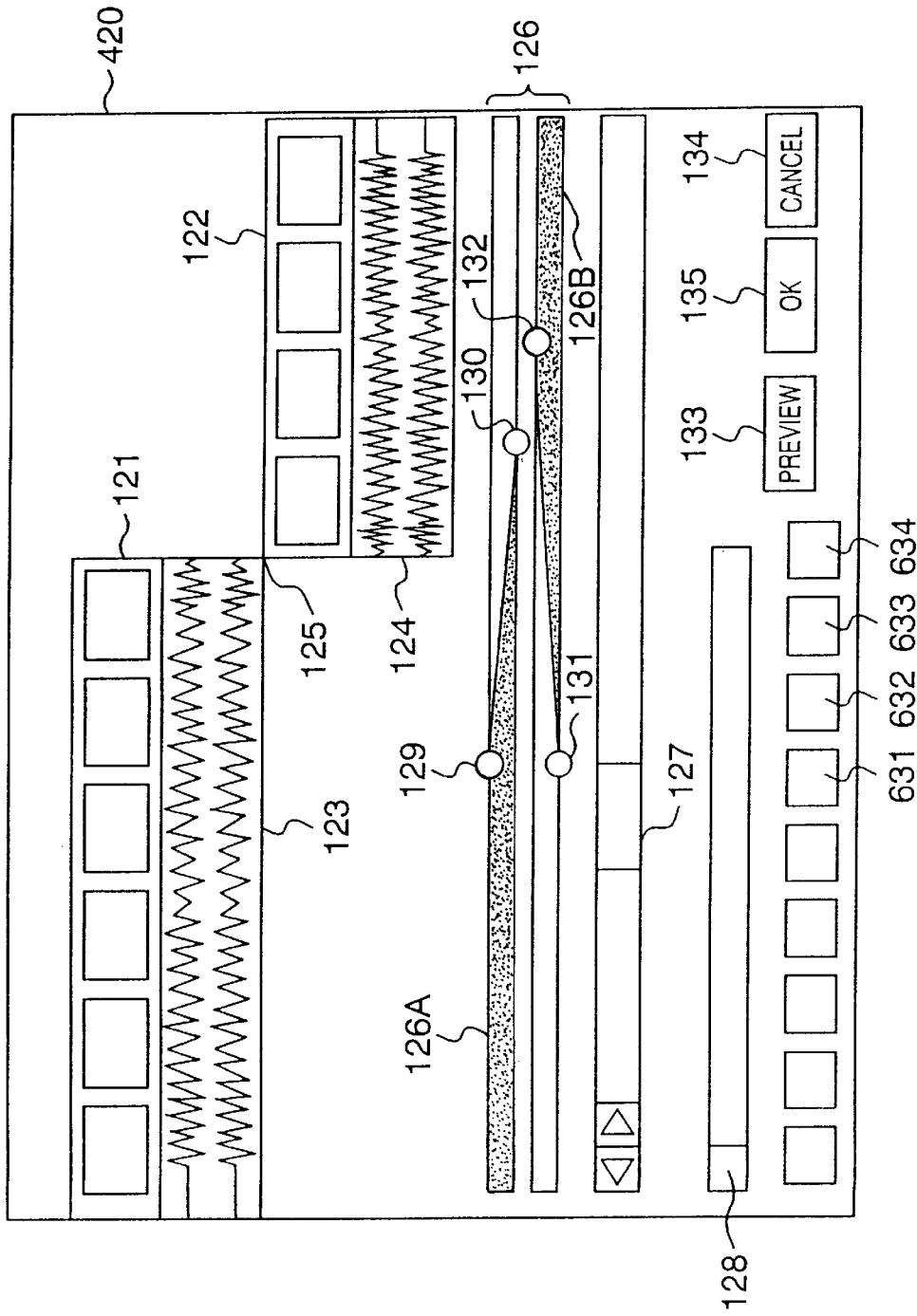
FIGS. 17A and 17B are examples of an editing screen display according to an embodiment of the present invention.

The case where overlap sound editing is conducted between a scene represented by an icon 422 (hereafter referred to as scene A) and a scene represented by an icon 425 (hereafter referred to as scene B) will now be considered. Transition to the editing mode is conducted by clicking the icon 422 and icon 425 with the mouse 509 and thereafter clicking an overlap editing button 427 included in a button group 426. As a result, an editing screen 420 is displayed. FIG. 17A is an enlarged view of this screen.

In FIG. 17A, numerals 121 and 122 denote contracted moving picture streams (image streams) obtained by arranging and displaying the high speed display moving pictures of respective frames in a predetermined section of moving pictures (hereafter referred to as picture A and picture B) respectively belonging to the scene A and the scene B, from the left to the right in time series so as to form a film image.

Numerals 123 and 124 denote waveform display portions of sounds corresponding to the scene A and the scene B (hereafter referred to as sound A and sound B). The waveforms are read out from the storage device 506. At this time, a splice position between scenes is denoted by 125.

As for the display, the operator manipulates an icon 128 for setting an interval between adjacent frames of a displayed picture of an image stream (hereafter referred to as setting icon). As a result, contracted pictures are displayed every preset number of frames. Furthermore, by manipulating a display position setting icon 127, an arbitrary section in the whole of the image streams 121 and 122 can be displayed.

In order to conduct the overlap editing for adaptively controlling and varying the sound volume so as to attenuate the sound A and augment the sound B in and near the splice position 125, the value of the sound volume control level is set according to each sound information. The CPU 501 reads out sound information of editing subjects of the sound A and the sound B from the magnetic storage device 506. On the basis of the sound information thus read out, the CPU 501 newly generates sound information attenuated with predetermined attenuation factors in the editing subject portion. The CPU 501 rewrites the generated sound information into the magnetic storage device 506.

As for the manipulation function in that case for making possible the sound volume control by selecting the range of the editing subject portion of each sound information and setting a predetermined attenuation factor of each sound information, it can be obtained by displayed figures including a lateral bar figure display portion 126. A lateral bar 126A corresponds to the sound A. The vertical width of its black portion represents the volume control level set for the each predetermined period of the sound A. A lateral bar 126B corresponds to the sound B. The vertical width of its black portion represents the volume control level set for the each predetermined period of the sound B.

Figure 21:
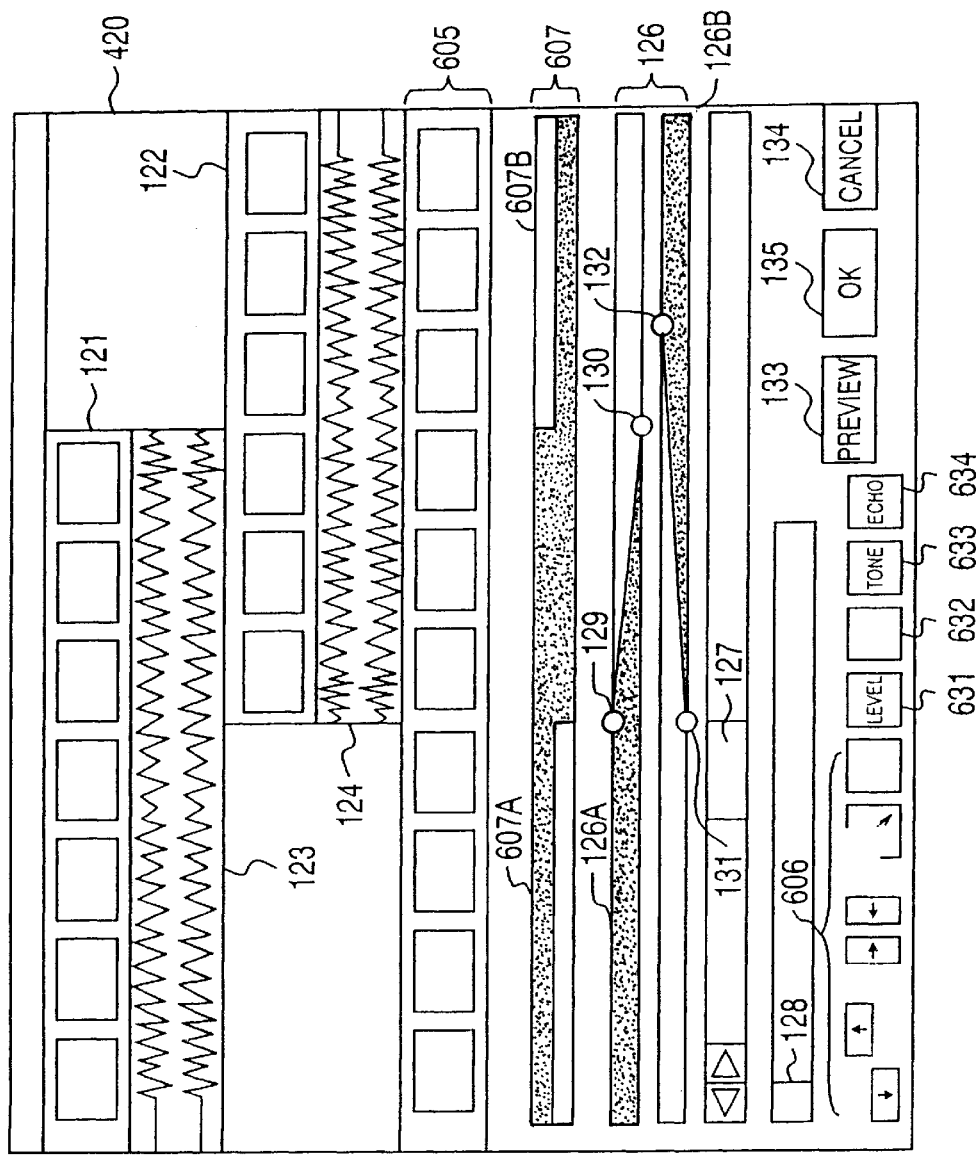
FIG. 21 is a schematic diagram showing another example of an editing screen display according to an embodiment of the present invention.

According to the sound editing of the present invention, not only the sound amplitude level but also a different sound parameter such as one of a plurality of sound quality levels or the musical interval can be adjusted in an arbitrarily specified editing section. For example, white circles 129 through 132 on the bar figure 126 are icons for specifying such adjustment sections of the sound parameter. The oblique slant portion of the bar figure 126 represents a gradual change of the sound parameter. Button icons 631, 632 and 633 for specifying the sound amplitude level, sound quality level, and musical interval may be provided in the window as shown in FIG. 21. The operator selects a sound parameter to be edited by clicking any one of the button icons 631, 632 and 633 with the mouse. If a button icon 634 is specified with the mouse, the sound in the editing section (at the time of fading) is subjected to an echo effect.

The white circle figure 129 is a setting icon for setting a level attenuation start point of the sound A. The white circle figure 130 is a setting icon for setting a level attenuation end point of the sound A. The white circle figure 131 is a setting icon for setting a level augmentation start point of the sound B. The white circle figure 132 is a setting icon for setting a level augmentation end point of the sound B.

The image stream 121 and 122 of the film image, sound waveform display portions 123 and 124, the lateral bar display portion 126, the display position setting icon 127, and the display interval setting icon 128 are subjected to display control so as to be mutually linked. The result of manipulation is immediately reflected.

While watching the image stream 121 and 122 resembling film images and the sound waveforms, the operator conducts the overlap editing by manipulating the lateral bars 126A and 126B.

Figure 17B:
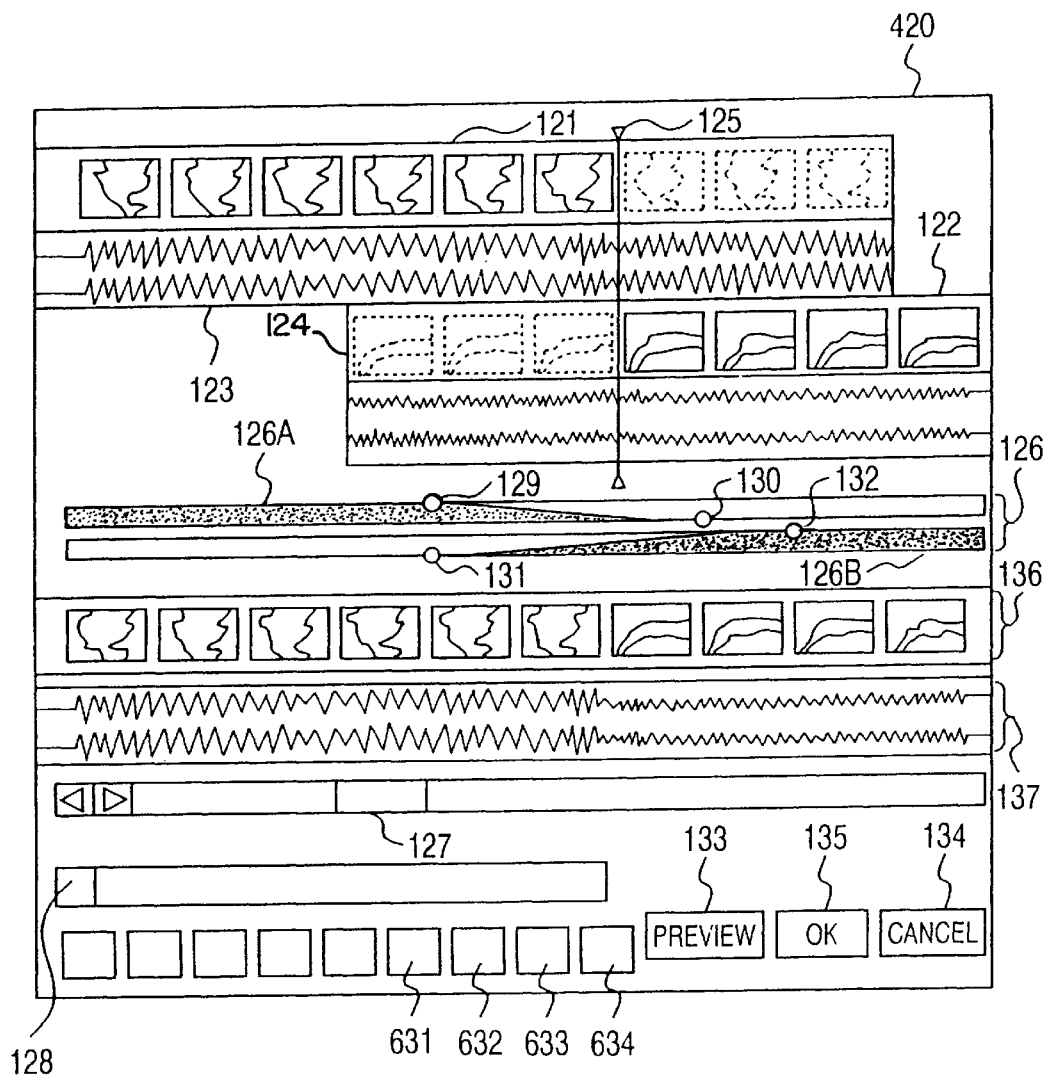

Another editing screen 420 is shown in FIG. 17B.

In FIG. 17B, numerals 121 and 122 denote contracted moving picture streams obtained by arranging and displaying the high speed display moving pictures of respective frames in a predetermined section of moving pictures (hereafter referred to as picture A and picture B) respectively belonging to the scene A and the scene B, from the left to the right in time series so as to form a film image.

The portions of dotted line of the contracted moving pictures denote no efficient part for the edited picture.

Numerals 123 and 124 denote waveform display portions of sounds corresponding to the scene A and the scene B (hereafter referred to as sound A and sound B). The waveforms are read out from the storage device 506. At this time, a splice position between scenes is denoted by 125.

The explanation of the elements having the same numerals as FIG. 17A is omitted. Numerals 136 and 137 denote edited picture image stream and sound image stream.

By referring to FIG. 18, the sound editing processing using the lateral bars 126A and 126B in this embodiment will now be described. By conducting a simple work of only specifying four white circle figures 129 through 132 and moving them in the lateral direction while watching the video image, the operator can arbitrarily set various parameters required for editing, such as a sound A attenuation start point position 521, a sound A attenuation end point position 522, a sound B augmentation start point position 523, a sound B augmentation end point position 524, split values 525 and 526, fade time lengths 527 and 528, and a transition time length 529.

Figure 18:
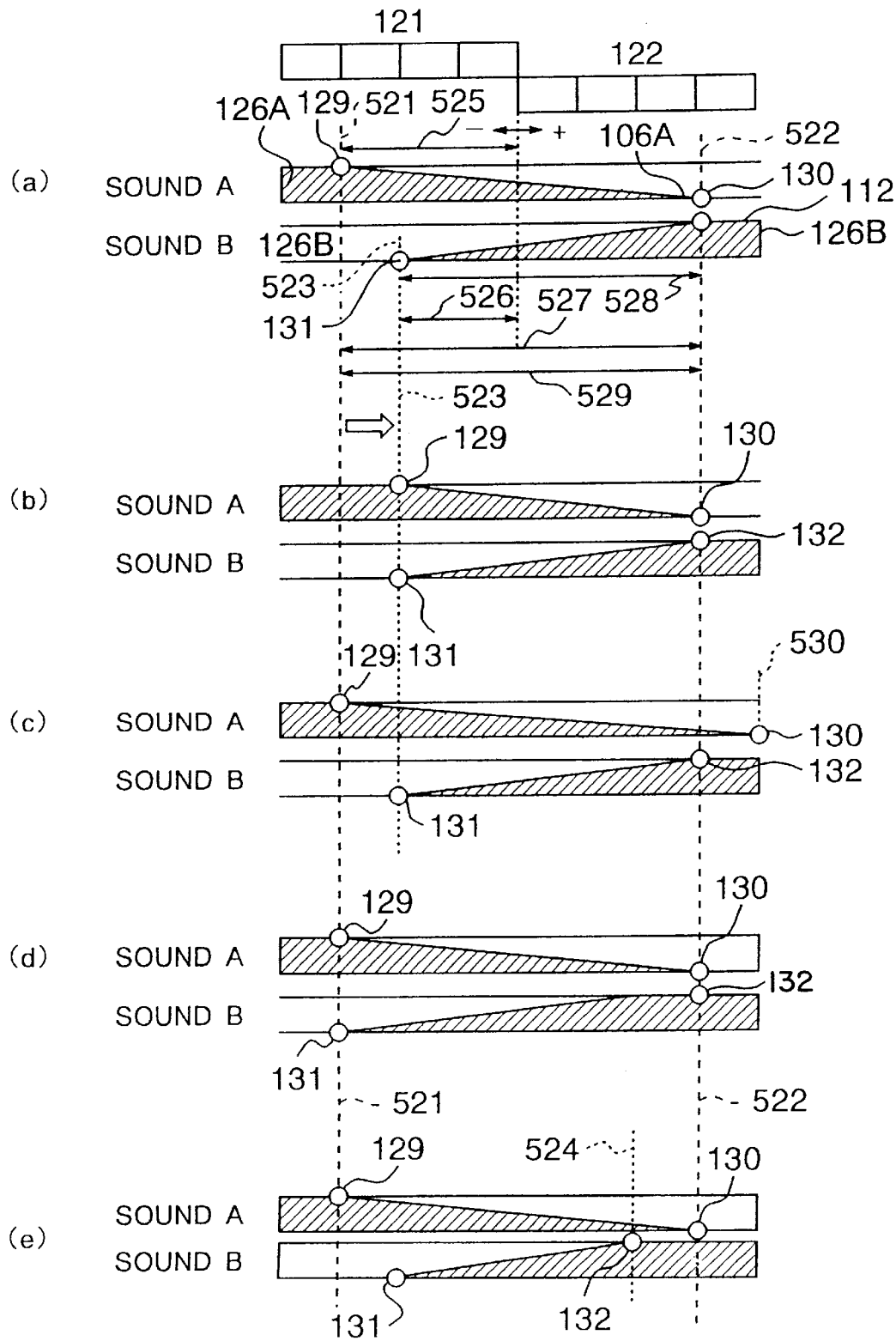
FIG. 18 is a diagram for explaining overlap sound editing in an embodiment of the present invention.

For example, it is now assumed that the white circle figure 129 is subjected to mouse drag and thereby moved from the position 521 of (a) of FIG. 18 to a position 523 as shown in (b) of FIG. 18. In that case, the attenuation start point position 521 of the sound A becomes later by, for example, one frame of the images. Accordingly, each of the split value 525 and the fade time length 527 of the sound A and the sound transition time length 529 between the sounds A and B is also reduced by, for example, a value corresponding to one frame. As a result, the sound A attenuates quicker than (a) of FIG. 18.

It is now assumed that the white circle figure 130 is moved from the position 522 of (a) of FIG. 18 to a position 530 as shown in (c) of FIG. 18. In this case, the attenuation end of the sound A is made later by, for example, one frame. Each of the fade time length of the sound A and the sound transition time length between A and B increases by, for example, a value corresponding to one frame. The sound A attenuates more gradually than the case of (a) of FIG. 18.

On the other hand, it is now assumed that the white circle figure 131 is moved from the position 523 of (a) of FIG. 18 to the position 521 as shown in (d) of FIG. 18. In this case, the augmentation start time of the sound B is made earlier by, for example, one frame. Each of the split value and the fade time length of the sound B increases by, for example, a value corresponding to one frame. As a result, the sound B augments gradually from an earlier time.

It is now assumed that the white circle FIG. 132 is moved from the position 522 of (a) of FIG. 18 to a position 524 as shown in (e) of FIG. 18. In this case, the augmentation end time of the sound B is made earlier by, for example, one frame. Each of the fade length of the sound B and the sound transition time between A and B decreases by, for example, a value corresponding to one frame. The sound B augments faster.

By doing so, therefore, in this embodiment, editing can be advanced easily so that the sound may be heard more smoothly even at the slice position between scenes.

This embodiment is configured so that the movement of four white circle figures 129, 130, 131 and 132 may be conducted also by clicking each picture of image streams 121 and 122 displayed on the screen 420 by a film image, with the mouse. Furthermore, this embodiment is configured so that the position of the lateral bar display portion 126 itself may be dragged with the mouse, and association of the video pictures with sounds may be shifted.

The embodiment is configured so that the result of editing may be determined at the end of the work by clicking an OK button 135.

Figure 19A:
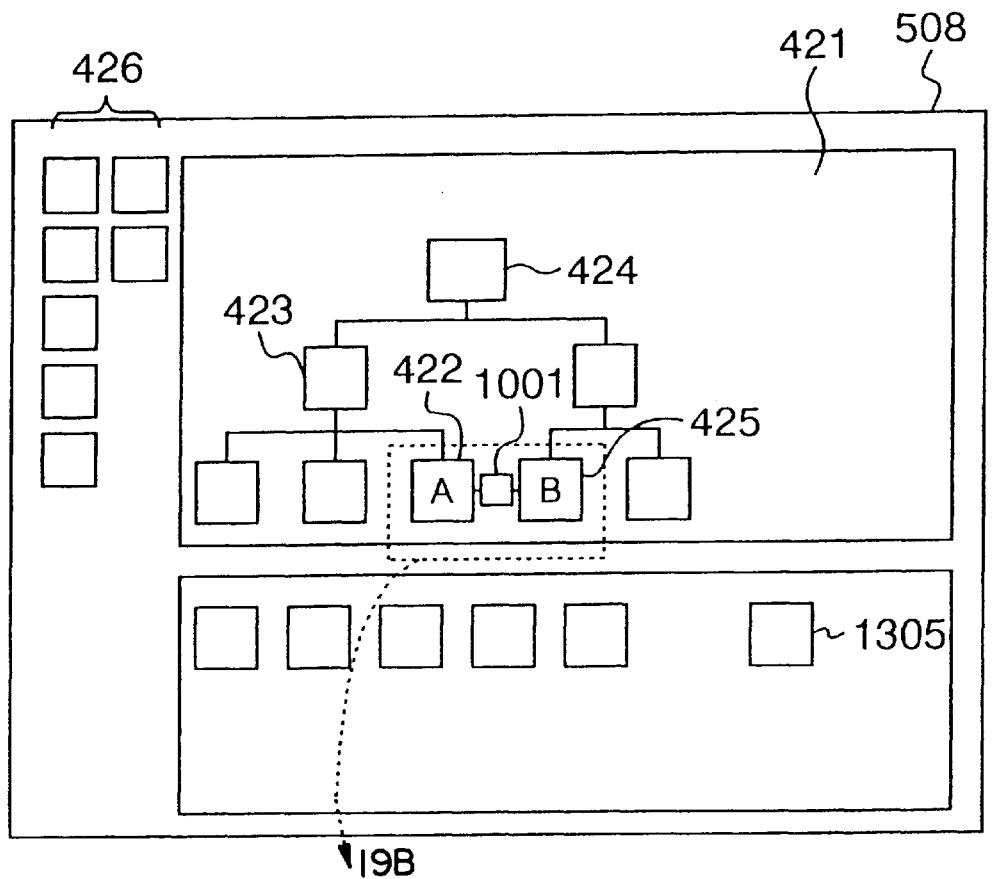
FIG. 19 is a schematic diagram of a display screen after overlap sound editing in an embodiment of the present invention.
Figure 19B:
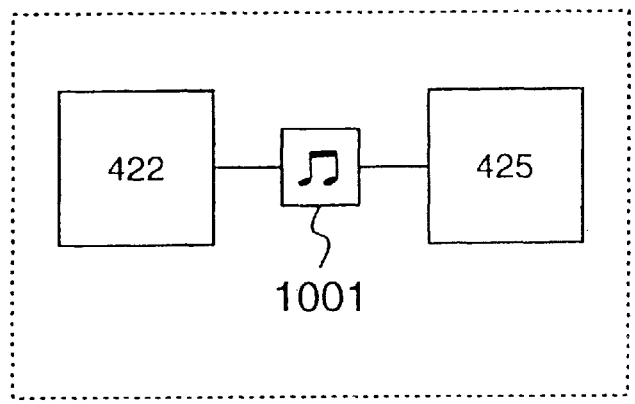

Thereby, moving pictures edited so as to incorporate the result of manipulation are stored in the magnetic storage device 506. At the same time, an alteration of the tree structure information is conducted. As a result, the display of the tree structure on the main window of the moving image editing apparatus is changed as shown in FIG. 19. At this time, the information representing that the editing including the sound has been carried out is also displayed on the main window of the moving image editing apparatus as a figure 1001 of FIG. 19.

In the case where the operator wants to confirm the editing state before determining the editing, a PREVIEW button 133 of FIG. 17 may be clicked by the mouse.

As a result, video pictures having a size of 640 by 480 compressed by the picture compressor/expander 511 and stored are displayed in a window 430 of the monitor 508 as shown in FIG. 20. The editing state can thus be confirmed easily.

This embodiment is configured so that editing may be conducted in the same way also in the case where special effect processing of video images such as the wipe or dissolve is desired to be conducted in a splice position between scenes. Hereafter, operation of sound editing accompanying the effect editing of video images will be described.

A shift to the editing mode at this time is conducted by an operation similar to the above described overlap editing. In the main window shown in FIG. 16, the icons 422 and 425 are clicked with the mouse 509. Thereafter, a special effect processing button 428 or 429 such as the wipe or dissolve included in a button group 426 is clicked. As a result, the editing screen 420 after the shift becomes as shown in FIG. 21.

The display screen of FIG. 21 is an editing screen of the case where the wipe processing has been selected by the operator. Here, the image streams 121 and 122, sound waveform display portions 123 and 124 respectively of the sound A and the sound B, the lateral bar display portion 126, the lateral bars 126A and 126B, the display interval setting icon 128, the display position setting icon 127, and the white circle figures 129 through 132 are the same as the foregoing description conducted with reference to FIG. 17A.

In FIG. 21, numeral 605 denotes pictures after editing obtained by conducting the wipe processing on the picture A and the picture B and displayed in a film image form as a contracted moving picture stream. The kind of the wipe effect at this time is determined by the operator's selection for wipe patterns 606.

Numeral 607 denotes a lateral bar display section representing the length of the wipe between the picture A and the picture B. Two lateral bars 607A and 607B represent the lengths of the portions in which the picture A and the picture B are displayed, respectively. Therefore, the overlapping portion of the lateral bars 607A and 607B represents the wipe length.

The function of determining the degree of attenuation of the sound A and augmentation of the sound B in the overlap portion is implemented by the lateral bar display portion 126. At this time, the white circle figure 129 provides the attenuation start point of the sound A, and the white circle figure 130 provides the attenuation end point of the sound A. In the same way, the white circle figure 131 provides the augmentation start point of the sound B, and the white circle figure 132 provides the augmentation end point of the sound B.

In these displays, the operator can select an arbitrary range for display by manipulating the display interval setting icon 128. By manipulating the display position setting icon 127, the operator can select an arbitrary section for display. At this time, the cut streams of the film image, the sound waveform display, the bars, and the icons are mutually linked. The result of manipulation for each bar or icon is immediately reflected to each other.

The effect editing processing using the lateral bar display portion 126 will now be described by referring to FIGS. 22 and 23.

By manipulating the lateral bar display portion 607 and the lateral bar display portion 126 while watching the moving image streams 121 and 122 each displayed in a film image form and the sound waveform display portions 123 and 124 as shown in FIG. 21, the operator conducts the overlap editing at the time of special effect processing of images such as the wipe and dissolve.

Figure 22:
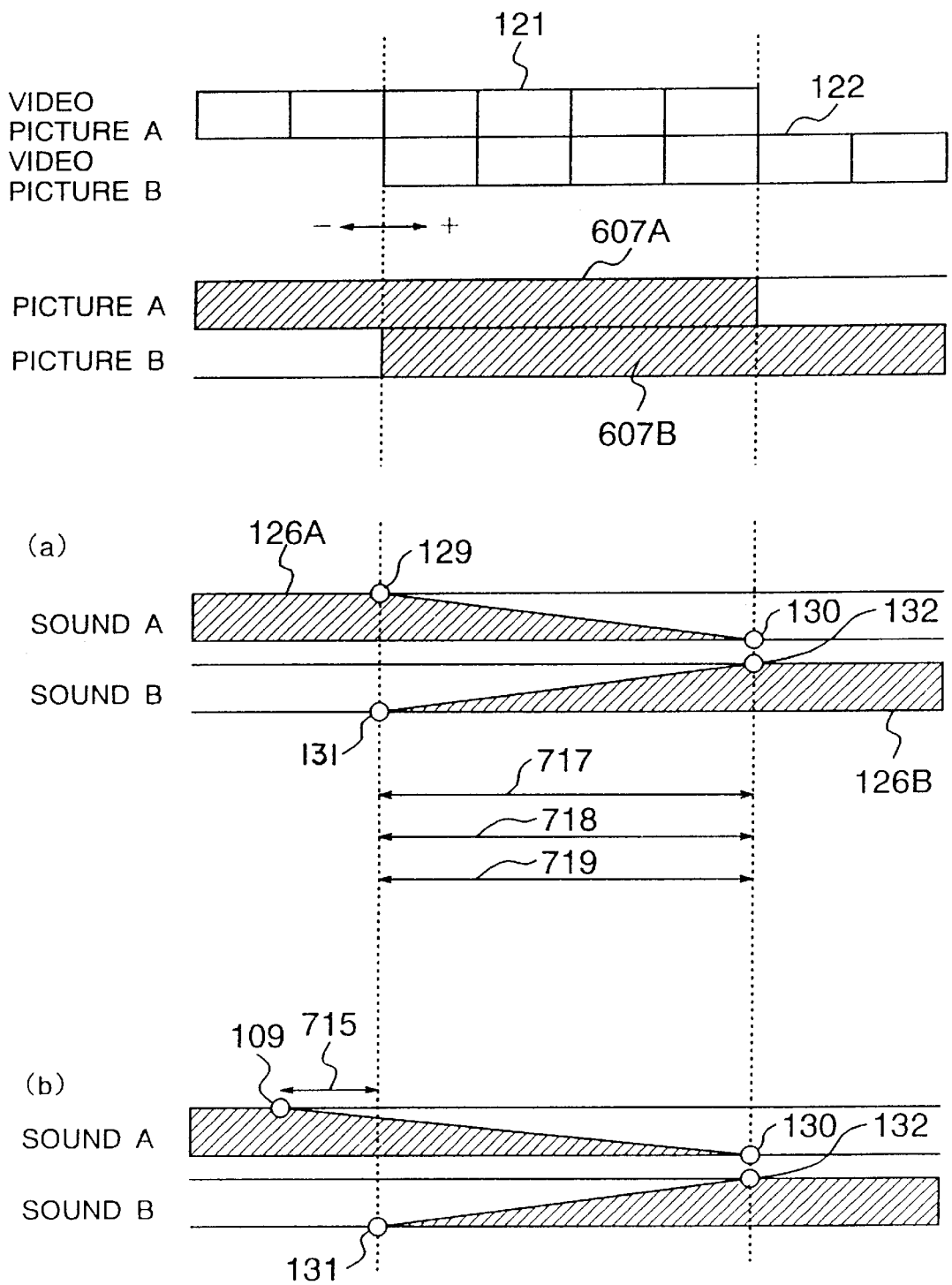
FIG. 22 is a diagram for explaining overlap sound editing in the case where a special effect such as wipe or dissolve has been applied to video pictures, in an embodiment of the present invention.

First of all, (a) of FIG. 22 shows such a state that the operator has provided the picture A and the picture B with an overlap portion by manipulating the lateral bars 607A and 607B with the mouse. The length of this overlap portion becomes the length of the wipe.

At this time, the lateral bars 126A and 126B are linked to the manipulation conducted on the lateral bars 607A and 607B, and automatically brought into the state shown in (a) of FIG. 22.

It is now assumed in the state of (a) of FIG. 22 that a white circle figure 129 is dragged with the mouse to move to a position shown in (b) of FIG. 22. Then a split value 715 of the sound A corresponding to, for example, 1 frame is generated. Each of a fade time length 717 and a sound transition time length 719 between A and B increases by a value corresponding to, for example, 1 frame. Thus the attenuation start of the sound A can be made to begin earlier than the start of the wipe.

Figure 23:
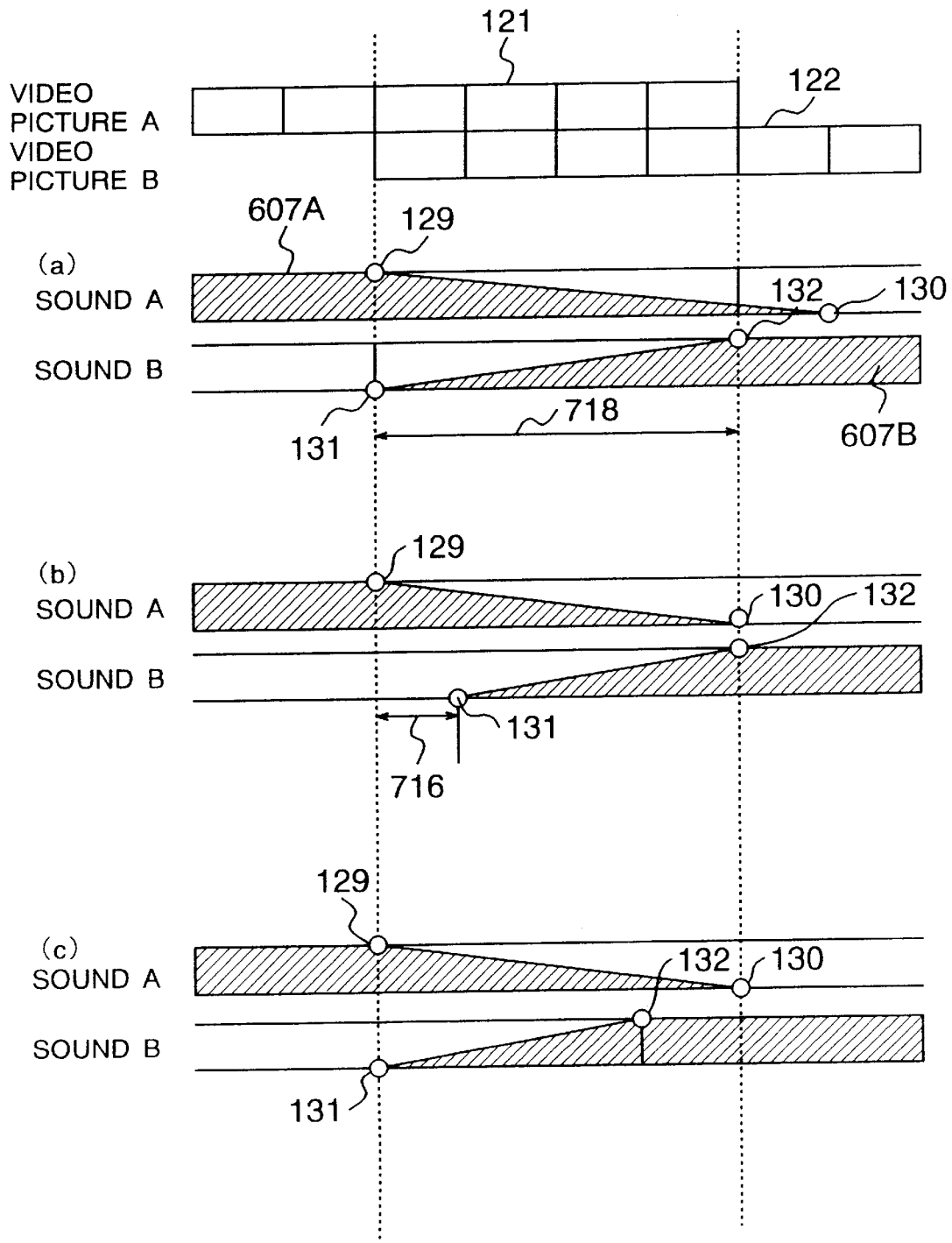
FIG. 23 is a diagram for explaining overlap sound editing in the case where a special effect such as wipe or dissolve has been applied to video pictures, in an embodiment of the present invention.

On the other hand, if a white circle figure 130 is moved from the state of (a) of FIG. 22 to the position of (a) of FIG. 23, each of the fade time length 717 of the sound A and the sound transition time length 719 between A and B increases by a value corresponding to, for example, 1 frame. Thus, it is possible to provide such an effect that the sound A is heard even after the wipe has been finished.

If a white circle figure 131 is moved from the state of (a) of FIG. 22 to the position of (b) of FIG. 23, then a split value 716 of the sound B corresponding to, for example, 1 frame is generated, and a fade time length 718 of the sound B decreases by a value corresponding to, for example, 1 frame. Thus the augmentation start of the sound B from the wipe start position is delayed.

If a white circle figure 132 is moved from the state of (a) of FIG. 22 to the position of (c) of FIG. 23, then the fade time length 718 of the sound B decreases by a value corresponding to, for example, 1 frame and the augmentation of the sound B is completed earlier than the wipe termination time.

In the special effect editing of images as well, therefore, sounds can be heard more smoothly.

At this time as well, determination of the editing result and confirmation using the image reproduction before determination can be conducted in the same way as the above described overlap editing in a splice position between scenes.

As a concrete example of the sound mixing editing operation according to this embodiment, the case of editing where a BGM (background music) is mixed with the scene represented by the icon 1303 displayed by the tree structure shown in FIG. 14 will now be described.

First of all, manipulation preceding the shift to the sound mixing editing mode will now be described.

In this case, a first requirement is that sound data containing the BGM is stored in the magnetic storage device 506 beforehand.

On this premise, a command for reading out this sound data into the present editing apparatus is given via the mouse or keyboard 509.

Thereupon, the CPU 501 creates an icon 1305 (hereafter referred to as sound icon) displayed as same as the icons 1302 through 1304 of the moving pictures shown in FIG. 14.

The sound icon 1305 required to handle sound data on the editing apparatus is thus set. Thereafter, by clicking this sound icon 1305 with the mouse in the same way as the icon of the moving pictures, it becomes possible to conduct sound reproduction and insertion work.

The method for shifting to the sound mixing editing mode will now be described.

There are the following two ways of shifting to the mode. In a first method, the sound icon 1305 is dragged with the mouse and dropped at the icon 1303. In a second method, the sound icon 1305 and the icon 1303 are selected, and a predetermined button of a button group 426 is clicked with the mouse. As a result, the screen display is changed, and the editing screen after the shift becomes as shown in FIG. 24.

Figure 24:
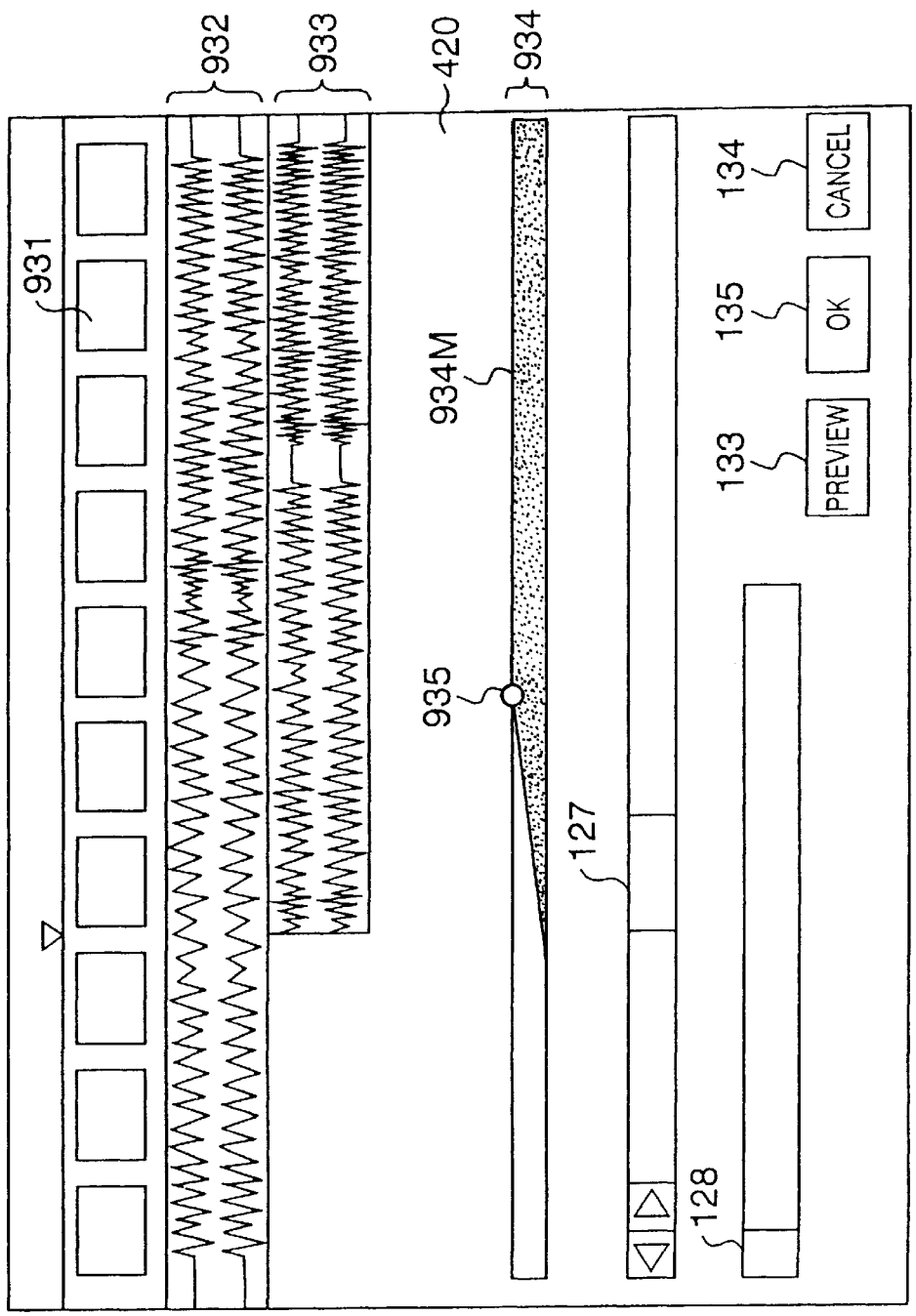
FIG. 24 is a schematic diagram showing still another example of an editing screen display according to an embodiment of the present invention.

In FIG. 24, numeral 931 denotes a contracted moving picture stream obtained by displaying frames of a fixed section of moving images belonging to a scene represented by the icon 1303 (FIG. 14), in a film image form in the same way as the above described case. At this time, the sound belonging to the scene represented by the icon 1303 is displayed in a waveform display portion 932, and the waveform of the sound to be mixed is displayed in a waveform display portion 933.

The vertical width of a black lateral bar 934M displayed in a lateral bar display portion 934 represents the volume control level set for the each predetermined period of the sound to be mixed. A white circle figure 935 represents a mixing augmentation completion point.

Here, each of the display position setting icon 127, the display interval setting icon 128, the OK button 135, and the PREVIEW button 133 has the same function as that in the case described before. Those figures, the film image, and the sound waveform display are mutually linked. Thus, results of manipulation for respective bars and icons are immediately reflected to each other.

With reference to the mixing editing screen of FIG. 24, the operator can first set a sound mixing augmentation completion point by specifying the white circle figure 935 with the mouse and moving the figure on the lateral bar 934M while watching the moving picture stream 931 displayed in the film image.

At this time, the lateral bar 934M has a function of gradually augmenting the mixing sound at the time of mixing start as illustrated so that sounds may be mixed without unnaturalness. Although not illustrated, the lateral bar 934M has also a function of gradually attenuating the mixing sound at the time of mixing end.

In this embodiment, it is possible to provide the sound mixing augmentation completion point even by clicking the moving picture stream 931 displayed in the film image with the mouse.

Figure 25:
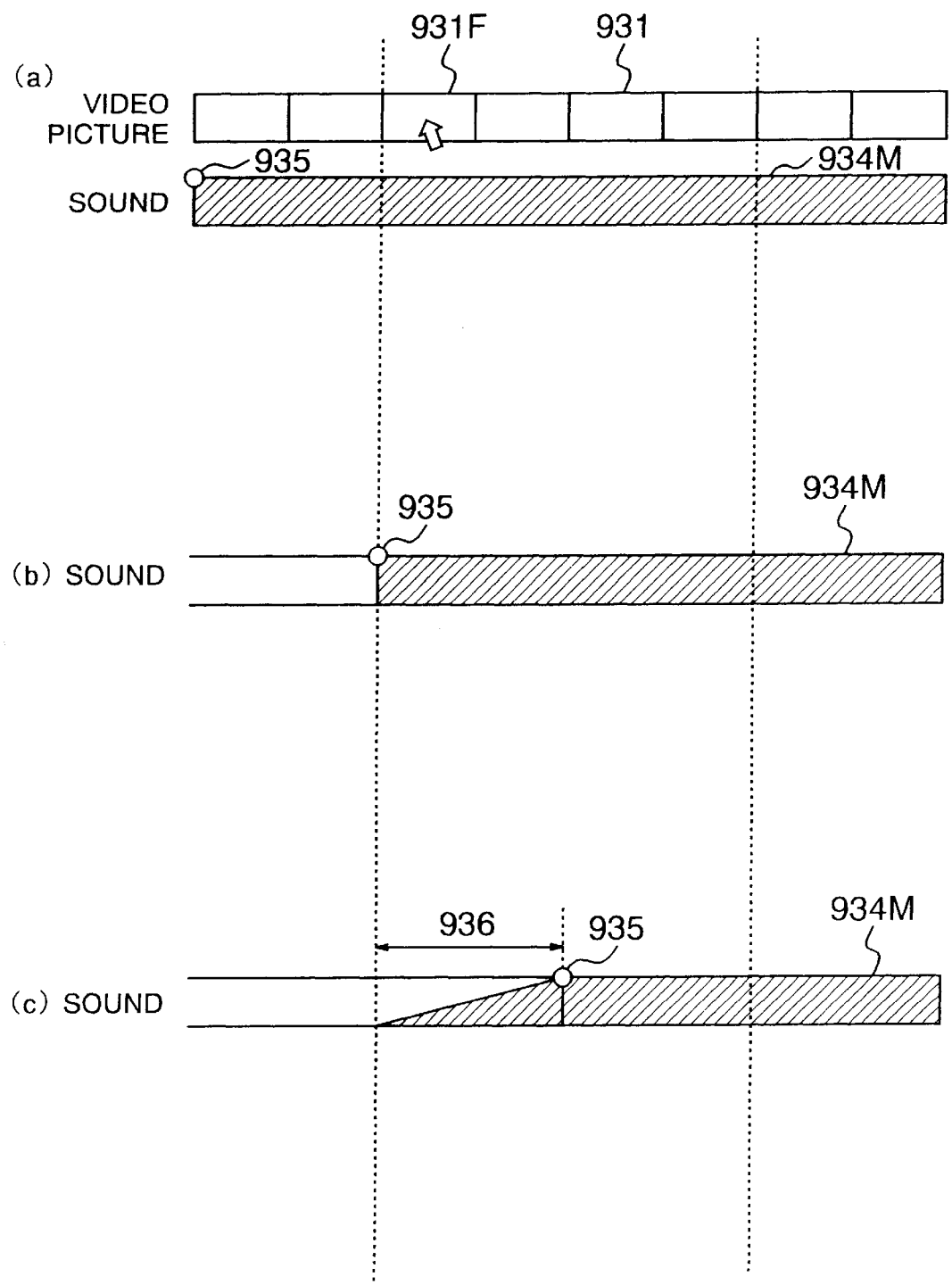
FIG. 25 is a diagram for explaining the operation of sound mixing editing in an embodiment of the present invention.

If in the state shown in (a) of FIG. 25 it is desired to make a frame 931F included in the picture stream 931 the mixing augmentation start point of the sound information, this frame 931F is clicked with the mouse. In linkage thereto, the FIG. 935 on the lateral bar 934M representing the level of the sound to be mixed is moved to the frame 931F as shown in (b) of FIG. 25.

Then a white circle figure 935 is moved with the mouse as shown in (c) of FIG. 25. Thereupon, mixing is conducted so that the sound volume control level may be gradually increased in a section 936.

Although not illustrated, the end time point of the sound mixing can also be specified on the lateral bar 934M of the sound with the mouse.

In the case where the editing processing is finished and the editing result is to be determined, the OK button 135 (FIG. 14) is clicked with the mouse.

Figure 26A:
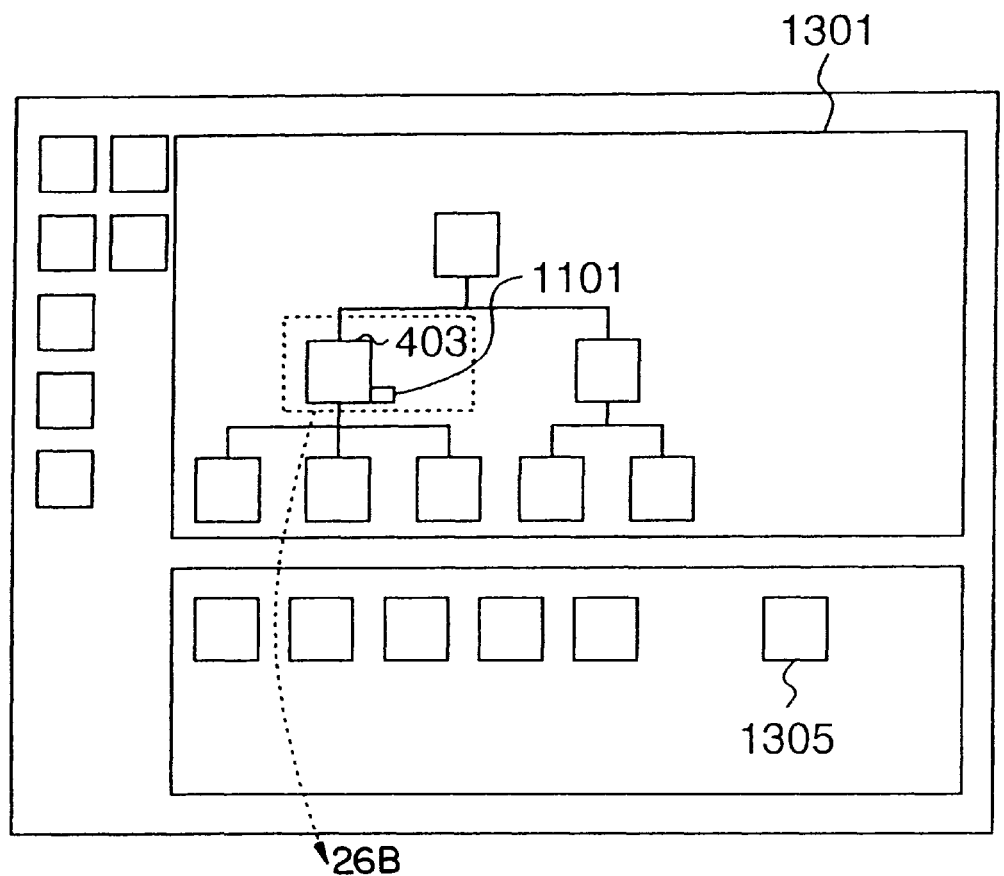
FIG. 26 is a schematic diagram of a display screen after sound mixing editing in an embodiment of the present invention.
Figure 26B:
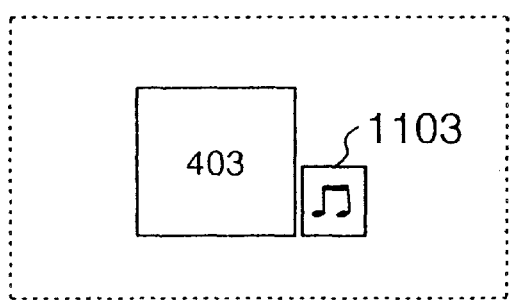

Moving images with the results of the editing processing heretofore described reflected therein are stored in the magnetic storage device 506. At the same time, alteration of the tree structure information is conducted. As a result, the display returns to the original main window. At this time, the display of the tree structure becomes as shown in FIG. 26. In the same way as the above described case, the information that the mixing editing of the sound information 1305 has been carried out is displayed on the main window 1301 as a figure 1101.

On the other hand, if it is desired to confirm the editing state before the completion of the editing work, the PREVIEW button is clicked with the mouse. Thereupon, the video pictures having a size of 640 by 480 compressed by the picture compressor/expander 511 and stored are reproduced on the monitor 508. In the same way as the case described before, the editing state can be thus confirmed easily.

According to the present embodiment, the relation between the picture and the sound is obtained so as to be quite obvious. While watching the video pictures, therefore, it is possible to easily determine, amend and alter the sound editing point.

Furthermore, according to the present invention, pictures used for editing are obtained as intuitive displays akin to human sensitivity. In sound editing, therefore, skill is not especially required. In this point as well, the editing is facilitated.

By referring to flow charts of FIGS. 27, 28 and 29, procedures of the case where the editing processing using the editing screens shown in FIGS. 17A, 21 and 24 is conducted under the control of a computer will now be described.

FIG. 27 is a flow chart showing the procedure of the overlap editing shown in FIG. 17A. If the overlap editing mode is selected by the operator, "REDRAW_FLAG" set in the memory 502 is initialized to a value of "0" at step 140. At step 141, the window 420 shown in FIG. 17A is displayed on the monitor 508. At step 142, interrupt input processing from the mouse 509 is conducted.

At step 143, it is determined whether an event of pressing the setting icon 127 has occurred. If the display position setting icon 127 has been pressed, the "REDRAW_FLAG" is set to a value of "1" at step 144. Furthermore, a display position specified by the operator is written into the memory 502 at step 145.

If it is determined at the step 143 that there is no occurrence of an event, it is determined at step 146 whether an event of pressing the display interval setting icon 128 has occurred. If the display position setting icon 128 has been pressed, the "REDRAW_FLAG" is set to a value of "1" at step 147. Furthermore, a display interval specified by the operator is written into the memory 502 at step 148.

If it is determined at the step 146 that there is no occurrence of an event, it is determined at step 149 whether an event of pressing any one of sound parameter icons (buttons) 631 through 633 has occurred. If any one of sound parameter icons 631 through 633 has been pressed, the "REDRAW_FLAG" is set to a value of "1" at step 150. Furthermore, a kind of a control parameter specified by the operator is written into the memory 502 at step 151.

If it is determined at the step 149 that there is no occurrence of an event, it is determined at step 152 whether an event of pressing an echo icon (button) 634 has occurred. If the echo icon 634 has been pressed, the "REDRAW_FLAG" is set to a value of "1" at step 153. Furthermore, information of the echo effect is written into the memory 502 at step 154.

If it is determined at the step 152 that there is no occurrence of an event, it is determined at step 155 whether an event of pressing the white circle figure 129 has occurred. If the white circle figure 129 has been pressed, the "REDRAW_FLAG" is set to a value of "1" at step 156. Furthermore, the fade out start time of the sound A is written into the memory 502 at step 157.

If it is determined at the step 155 that there is no occurrence of an event, it is determined at step 158 whether an event of pressing the white circle figure 130 has occurred. If the white circle figure 130 has been pressed, the "REDRAW_FLAG" is set to a value of "1" at step 159. Furthermore, the fade out end time of the sound A is written into the memory 502 at step 160.

If it is determined at the step 158 that there is no occurrence of an event, it is determined at step 161 whether an event of pressing the white circle figure 131 has occurred. If the white circle figure 131 has been pressed, the "REDRAW_FLAG" is set to a value of "1" at step 162. Furthermore, the fade in start time of the sound B is written into the memory 502 at step 163.

If it is determined at the step 161 that there is no occurrence of an event, it is determined at step 164 whether an event of pressing the white circle figure 132 has occurred. If the white circle figure 132 has been pressed, the "REDRAW_FLAG" is set to a value of "1" at step 165. Furthermore, the fade in end time of the sound B is written into the memory 502 at step 166.

If it is determined at the step 164 that there is no occurrence of an event, it is determined at step 167 whether an event of pressing the picture stream 121 has occurred. If the picture stream 121 has been pressed, the "REDRAW_FLAG" is set to a value of "1" at step 168. Furthermore, the fade in/out time information of each of the sound A and the sound B is written into the memory 502 according to the preselected state of each white circle figure at step 169.

If it is determined at the step 167 that there is no occurrence of an event, it is determined at step 170 whether an event of pressing the picture stream 122 has occurred. If the picture stream 122 has been pressed, the "REDRAW_FLAG" is set to a value of "1" at step 171. Furthermore, the fade in/out time information of each of the sound A and the sound B is written into the memory 502 according to the preselected state of each white circle figure at step 172.

If it is determined at the step 170 that there is no occurrence of an event, it is determined at step 173 whether an event of pressing the lateral bar display portion 126 has occurred. If the lateral bar display portion 126 has been pressed, the "REDRAW_FLAG" is set to a value of "1" at step 174. Furthermore, the value of association relation between the video picture and the sound is written into the memory 502 at step 175.

If it is determined at the step 173 that there is no occurrence of an event, it is determined at step 176 whether an event of pressing the PREVIEW button 133 has occurred. If the PREVIEW button 133 has been pressed, the preview window 430 is opened on the display screen at step 177. Furthermore, the window 420 is closed on the display screen at step 178.

If it is determined at the step 176 that there is no occurrence of an event, it is determined at step 179 whether an event of pressing the OK button 135 has occurred. If the OK button 135 has been pressed, then the picture (image) of the editing result is displayed on the monitor and the editing result is stored in the magnetic storage device 506 at step 180.

If it is determined at the step 179 that there is no occurrence of an event or after the processing of the step 180 is conducted, it is determined at step 181 whether an event of pressing the CANCEL button 134 has occurred. If the CANCEL button 134 has been pressed, the processing of the step 178 is conducted.

If it is determined at the step 181 that there is no occurrence of an event or after the processing of one of the steps 145, 148, 151, 154, 157, 160, 163, 166, 169, 172, and 175 is conducted, it is determined at step 182 whether the "REDRAW_FLAG" is "1." If it is determined at the step 182 that the "REDRAW_FLAG" is "1," the picture corresponding to the edited contents is displayed on the monitor, at step 183. Furthermore, the processing returns to the step 140. If it is determined at the step 182 that the "REDRAW_FLAG" is not "1," the processing returns to the step 140.

If the processing of the step 178 is conducted, the overlap editing mode is once finished.

Next, FIG. 28 is a flow chart showing the procedure of the wipe editing shown in FIG. 21. If the wipe editing mode is selected by the operator, "REDRAW_FLAG" set in the memory 502 is initialized to a value of "0" at step 240. At step 241, the window 420 shown in FIG. 21 is displayed on the monitor 508. At step 242, interrupt input processing from the mouse 509 is conducted.

At step 243, it is determined whether an event of pressing the setting icon 127 has occurred. If the display position setting icon 127 has been pressed, the "REDRAW_FLAG" is set to a value of "1" at step 244. Furthermore, a display position specified by the operator is written into the memory 502 at step 245.

If it is determined at the step 243 that there is no occurrence of an event, it is determined at step 246 whether an event of pressing the display interval setting icon 128 has occurred. If the display position setting icon 128 has been pressed, the "REDRAW_FLAG" is set to a value of "1" at step 247. Furthermore, a display interval specified by the operator is written into the memory 502 at step 248.

If it is determined at the step 246 that there is no occurrence of an event, it is determined at step 249 whether an event of pressing the lateral bar 607 has occurred. If the lateral bar 607 has been pressed, the "REDRAW_FLAG" is set to a value of "1" at step 250. Furthermore, an overlap quantity of the video pictures specified by the operator is written into the memory 502 at step 251.

If it is determined at the step 249 that there is no occurrence of an event, it is determined at step 252 whether an event of pressing the white circle FIG. 129 has occurred. If the white circle figure 129 has been pressed, the "REDRAW_FLAG" is set to a value of "1" at step 253. Furthermore, the fade out start time of the sound A is written into the memory 502 at step 254.

If it is determined at the step 252 that there is no occurrence of an event, it is determined at step 255 whether an event of pressing the white circle figure 130 has occurred. If the white circle figure 130 has been pressed, the "REDRAW_FLAG" is set to a value of "1" at step 256.

Furthermore, the fade out end time of the sound A is written into the memory 502 at step 257.

If it is determined at the step 255 that there is no occurrence of an event, it is determined at step 258 whether an event of pressing the white circle figure 131 has occurred. If the white circle figure 131 has been pressed, the "REDRAW_FLAG" is set to a value of "1" at step 259. Furthermore, the fade in start time of the sound B is written into the memory 502 at step 260.

If it is determined at the step 258 that there is no occurrence of an event, it is determined at step 261 whether an event of pressing the white circle figure 132 has occurred. If the white circle figure 132 has been pressed, the "REDRAW_FLAG" is set to a value of "1" at step 262. Furthermore, the fade in end time of the sound B is written into the memory 502 at step 263.

If it is determined at the step 261 that there is no occurrence of an event, it is determined at step 264 whether an event of pressing the picture stream 121 has occurred. If the picture stream 121 has been pressed, the "REDRAW_FLAG" is set to a value of "1" at step 265. Furthermore, the fade in/out time information of each of the sound A and the sound B is written into the memory 502 according to the preselected state of each white circle figure at step 266.

If it is determined at the step 264 that there is no occurrence of an event, it is determined at step 267 whether an event of pressing the picture stream 122 has occurred. If the picture stream 122 has been pressed, the "REDRAW_FLAG" is set to a value of "1" at step 268. Furthermore, the fade in/out time information of each of the sound A and the sound B is written into the memory 502 according to the preselected state of each white circle figure at step 269.

If it is determined at the step 267 that there is no occurrence of an event, it is determined at step 270 whether an event of pressing the lateral bar display portion 126 has occurred. If the lateral bar display portion 126 has been pressed, the "REDRAW_FLAG" is set to a value of "1" at step 271. Furthermore, the value of association relation between the video picture and the sound is written into the memory 502 at step 272.

If it is determined at the step 270 that there is no occurrence of an event, it is determined at step 273 whether an event of pressing the PREVIEW button 133 has occurred. If the PREVIEW button 133 has been pressed, the preview window 430 is opened on the display screen at step 274. Furthermore, the window 420 is closed on the display screen at step 275.

If it is determined at the step 273 that there is no occurrence of an event, it is determined at step 276 whether an event of pressing the OK button 135 has occurred. If the OK button 135 has been pressed, the picture (image) of the editing result is displayed on the monitor and the editing result is stored in the magnetic storage device 506 at step 277.

If it is determined at the step 276 that there is no occurrence of an event or after the processing of the step 275 is conducted, it is determined at step 278 whether an event of pressing the CANCEL button 134 has occurred. If the CANCEL button 134 has been pressed, the processing of the step 275 is conducted.

If it is determined at the step 278 that there is no occurrence of an event or after the processing of one of the steps 245, 248, 251, 254, 257, 260, 263, 266, 269, and 272 is conducted, it is determined at step 279 whether the "REDRAW_FLAG" is "1." If it is determined at the step 279 that the "REDRAW_FLAG" is "1," the picture corresponding to the edited contents is displayed on the monitor, at step 280. Furthermore, the processing returns to the step 240. If it is determined at the step 279 that the "REDRAW_FLAG" is not "1," the processing returns to the step 240.

If the processing of the step 275 is completed, the wipe editing mode is once finished.

Figure 29B:
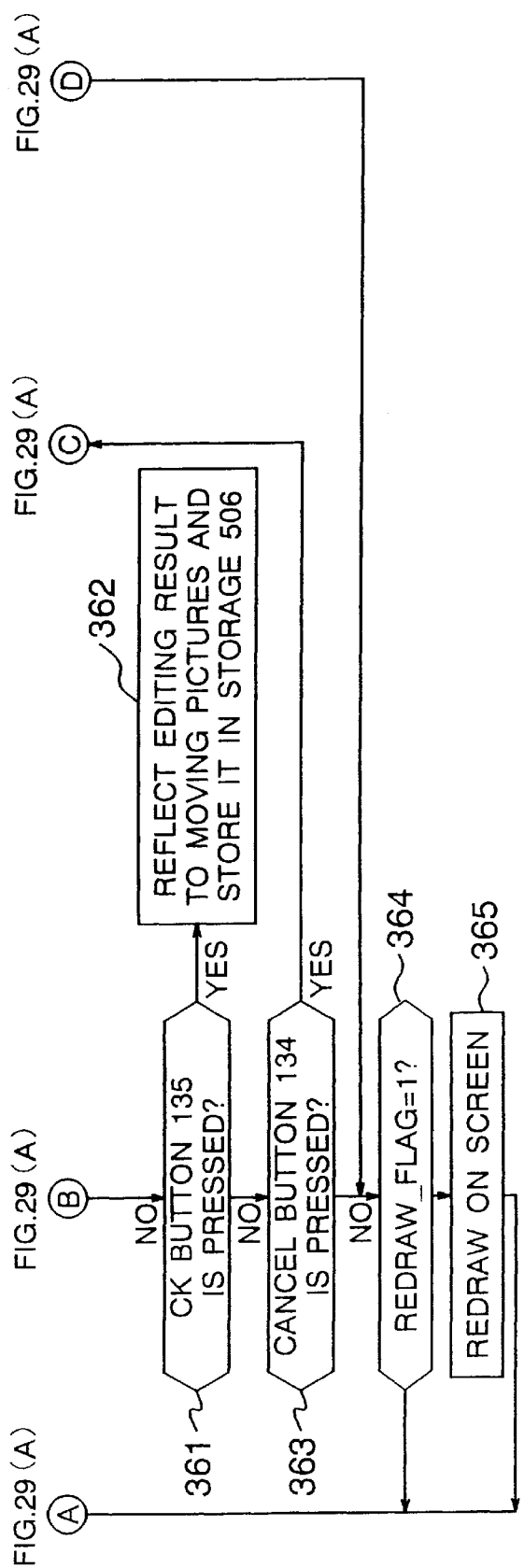
FIG. 29 is a flow chart showing the procedure of mixing editing shown in FIG. 24.

Next, FIG. 29 is a flow chart showing the procedure of the mixing editing shown in FIG. 24. If the mixing editing mode is selected by the operator, "REDRAW_FLAG" set in the memory 502 is initialized to a value of "0" at step 340. At step 341, the window 420 shown in FIG. 24 is displayed on the monitor 508. At step 342, interrupt input processing from the mouse 509 is conducted.

At step 343, it is determined whether an event of pressing the display position setting icon 127 has occurred. If the display position setting icon 127 has been pressed, the "REDRAW_FLAG" is set to a value of "1" at step 344. Furthermore, a display position specified by the operator is written into the memory 502 at step 345.

If it is determined at the step 343 that there is no occurrence of an event, it is determined at step 346 whether an event of pressing the display interval setting icon 128 has occurred. If the display position setting icon 128 has been pressed, the "REDRAW_FLAG" is set to a value of "1" at step 347. Furthermore, a display interval specified by the operator is written into the memory 502 at step 348.

If it is determined at the step 346 that there is no occurrence of an event, it is determined at step 349 whether an event of pressing the lateral bar display portion 934 has occurred. If the lateral bar display portion 934 has been pressed, the "REDRAW_FLAG" is set to a value of "1" at step 350. Furthermore, the fade in start time of the mixing sound specified by the operator is written into the memory 502 at step 351.

If it is determined at the step 349 that there is no occurrence of an event, it is determined at step 352 whether an event of pressing the picture stream 931 has occurred. If the picture stream 931 has been pressed, the "REDRAW_FLAG" is set to a value of "1" at step 353. Furthermore, the fade in start time of the sound is written into the memory 502 at step 354.

If it is determined at the step 352 that there is no occurrence of an event, it is determined at step 355 whether an event of pressing the white circle FIG. 935 has occurred. If the white circle FIG. 935 has been pressed, the "REDRAW_FLAG" is set to a value of "1" at step 356. Furthermore, the fade in end time of the sound is written into the memory 502 at step 357.

If it is determined at the step 355 that there is no occurrence of an event, it is determined at step 358 whether an event of pressing the PREVIEW button 133 has occurred. If PREVIEW button 133 has been pressed, the preview window 430 is opened on the display screen at step 359. Furthermore, the window 420 is closed on the display screen at step 360.

If it is determined at the step 358 that there is no occurrence of an event, it is determined at step 361 whether an event of pressing the OK button 135 has occurred. If the OK button 135 has been pressed, the picture (image) of the editing result is displayed on the monitor and the editing result is stored in the magnetic storage device 506 at step 362.

If it is determined at the step 361 that there is no occurrence of an event or after the processing of the step 362 is conducted, it is determined at step 363 whether an event of pressing the CANCEL button 134 has occurred. If the CANCEL button 134 has been pressed, the processing of the step 360 is conducted.

If it is determined at the step 363 that there is no occurrence of an event or after the processing of one of the steps 345, 348, 351, 354, and 357 is conducted, it is determined at step 364 whether the "REDRAW_FLAG" is "1." If it is determined at the step 364 that the "REDRAW_FLAG" is "1," the picture corresponding to the edited contents is displayed on the monitor at step 365. Furthermore, the processing returns to the step 340. If it is determined at the step 364 that the "REDRAW_FLAG" is not "1," the processing returns to the step 340. If the processing of the step 360 is conducted, the overlap editing mode is once finished.

The editing processing programs represented by the flow charts shown in FIGS. 27 through 29 are stored on the memory 502 in a code signal form which can be read by the CPU 501. The memory 502 may be a recording medium such as a semiconductor memory, a CD-ROM, a magnetic disk, or an optical disk.

It is evident that the present invention is not limited to the embodiments heretofore described, and persons skilled in the art may conduct various improvements and modifications on the basis of the disclosure.

What is claimed is:

1. An image information materials editing method for conducting editing processing on image information materials, each of said image information materials including moving picture information and sound information, said method comprising:

storing said image information materials into a storage device;

reading out a plurality of said image information materials to be edited from said storage device;

editing a plurality of moving picture information contained in said plurality of said image information read from said storage device to generate edited moving picture information as an image stream;

editing a plurality of said sound information contained in said plurality of said image information materials read from said storage device by adjusting parameters relating to said sound information so that at least two of said plurality of said sound information are smoothly overlapped to generate edited sound information; and displaying said edited sound information and said edited moving picture information on a screen.

2. An image information material editing method according to claim 1, wherein said editing a plurality of moving picture information comprises:

displaying said moving picture information in a film image, displaying film images of a plurality of different moving picture information pieces on the screen so as to be distinguishable from each other, and mutually coupling said different moving picture information pieces; and wherein said editing a plurality of said sound information comprises:

adjusting the parameters relating to said sound information in response to user commands.

3. An image information material editing method according to claim 2, wherein when overlap editing of mutually overlapping portions of said different moving picture information pieces, said method comprises:

displaying an overlap region of said different moving picture information pieces on the screen; and adjusting the parameters relating to said sound information in said overlap region in response to user commands.

4. An image information material editing method according to claim 3, further comprising:

commanding by the user to implement an editing processing for changing an amplitude level of the sound of said sound information in an editing position; and displaying a changing state of sound level at a editing position specified according to a user command on the screen.

5. An image information material editing method according to claim 4, further comprising:

displaying an amplitude level of the sound on the screen by using a bar figure; and displaying a change point of the amplitude level on said bar figure by using a specific figure.

6. An image information material editing method according to claim 5, further comprising:

displaying a change start point and a change end point of said amplitude level on said bar figure by using said specific figure.

7. An image information material editing method according to claim 3, wherein a displayed editing position of said sound information is changed so as to be linked to an alteration of the editing position of said moving picture information.

8. An image information material editing method according to claim 1, wherein when editing a display of said moving picture information in a film image, and mixing predetermined sound information in a portion of said moving picture information, said method comprises:

specifying a position of said moving picture information in which said predetermined sound information is to be inserted in response to a user command;

coupling said predetermined sound information with said moving picture information in the specified position in accordance with said user command; and displaying a figure indicating that said predetermined sound information is mixed with said moving picture information on said screen.

9. An image information material editing method according to claim 8, further comprising:

storing said predetermined sound information in said storage device;

displaying a figure identifying said predetermined sound information on said screen;

when the user specifies said figure identifying said predetermined sound information and superimposes said figure on a film image of desired moving picture information, mixing said predetermined sound information with the moving picture informations; and displaying said figure identifying said predetermined sound information superimposed thereon.

10. An image information material editing method according to claim 1, further comprising:

creating contracted moving pictures by thinning pixels of said moving picture information and storing the contracted moving pictures in said storage device, wherein the moving pictures of a film image are created from said contracted moving pictures read out from said storage device and displayed.

11. An image information materials editing system for conducting editing processing on image information materials containing sound information and moving picture information with the aid of a computer, said image information material editing system comprising:

a storage device for storing information of said image information materials;

means for reading out said image information material from said storage device;

a display device for displaying said image information materials read out from said storage;

editing control means, responsive to user commands, for displaying an editing position of moving picture information and sound information contained in said image information materials read out from said storage device, altering said editing position, conducting an editing processing on said moving picture information contained in said image information materials read out from said storage device in response to a user command, displaying edited image information on a screen of said display device, and editing a plurality of said sound information contained in said image information materials read out from said storage device by adjusting parameters relating to said sound information so that at least two of said plurality of said sound information are smoothly overlapped; and means for displaying said edited moving picture information and said edited sound information relating to said edited moving picture information on said screen in a common time axis.

12. An image information material editing system according to claim 11, wherein said editing control means comprises:

means for forming first and second film images formed by a connection of a plurality of frame pictures from said moving picture information read out from said storage device;

means for forming a third film image from said moving picture information with specified picture editing processing conducted thereon; and means for displaying said first to third film images together on said display device.

13. An image information material editing system according to claim 12, further comprising:

picture contracting means for creating contracted moving pictures by thinning out pixels of said moving picture information and storing the contracted moving pictures in said storage device; and means for creating the moving pictures of said film image from said contracted moving pictures read out from said storage device.

* * * * *